United States Patent
Lee et al.

(10) Patent No.: US 7,047,177 B1
(45) Date of Patent: May 16, 2006

(54) THIN CLIENT SIZING TOOL FOR ENTERPRISE SERVER FARM SOLUTION CONFIGURATOR

(75) Inventors: Sharon Marie Lee, Mission Viejo, CA (US); Leonard Eugene Eismann, Rancho Santa Margarita, CA (US); Kathryn Ann McDonald, Yorba Linda, CA (US)

(73) Assignee: Unisys Corporation, Blue Bell, PA (US)

( * ) Notice: Subject to any disclaimer, the term of this patent is extended or adjusted under 35 U.S.C. 154(b) by 855 days.

(21) Appl. No.: 09/813,667

(22) Filed: Mar. 21, 2001

(51) Int. Cl.
*G06F 9/45* (2006.01)
*G06F 15/16* (2006.01)
*G06F 15/173* (2006.01)

(52) U.S. Cl. ............... 703/22; 703/23; 718/104; 709/203; 709/226

(58) Field of Classification Search ........ 709/220–224, 709/227, 228, 238–242, 226; 379/16, 211, 379/212, 230, 219, 220, 305, 210, 265; 703/26, 703/22, 23; 718/104; 715/853
See application file for complete search history.

(56) References Cited

U.S. PATENT DOCUMENTS

| 5,668,995 | A  | * | 9/1997  | Bhat ........................... 718/104 |
| 6,041,325 | A  | * | 3/2000  | Shah et al. ................... 707/10 |
| 6,212,559 | B1 | * | 4/2001  | Bixler et al. ................. 709/221 |
| 6,457,048 | B1 | * | 9/2002  | Sondur et al. ............... 709/220 |
| 6,496,948 | B1 | * | 12/2002 | Smorodinsky ............... 714/37 |
| 6,571,283 | B1 | * | 5/2003  | Smorodinsky .............. 709/220 |
| 2002/0095487 | A1 | * | 7/2002  | Day |
| 2002/0156904 | A1 | * | 10/2002 | Gullotta et al. |

OTHER PUBLICATIONS

Schmidt et al., B.K. The Interactive Performance of SLIM: A Stateless Thin-Client Architecture, ACM SIGOPS Operating Systems Review, Proceeedings of the 17th ACM Operating Systems Principles SOSP '99, Dec. 1999, pp. 32-47.*

* cited by examiner

*Primary Examiner*—Russell Frejd
(74) *Attorney, Agent, or Firm*—Alfred W. Kozak; Mark T. Starr; Lisa A. Rode

(57) ABSTRACT

A Thin Client Sizing Tool provides a method for developing a proposal for an optimized Server Farm, or collection of Server Farms, which will provide the most suitable configuration for each specialized enterprise of a customer.

5 Claims, 35 Drawing Sheets

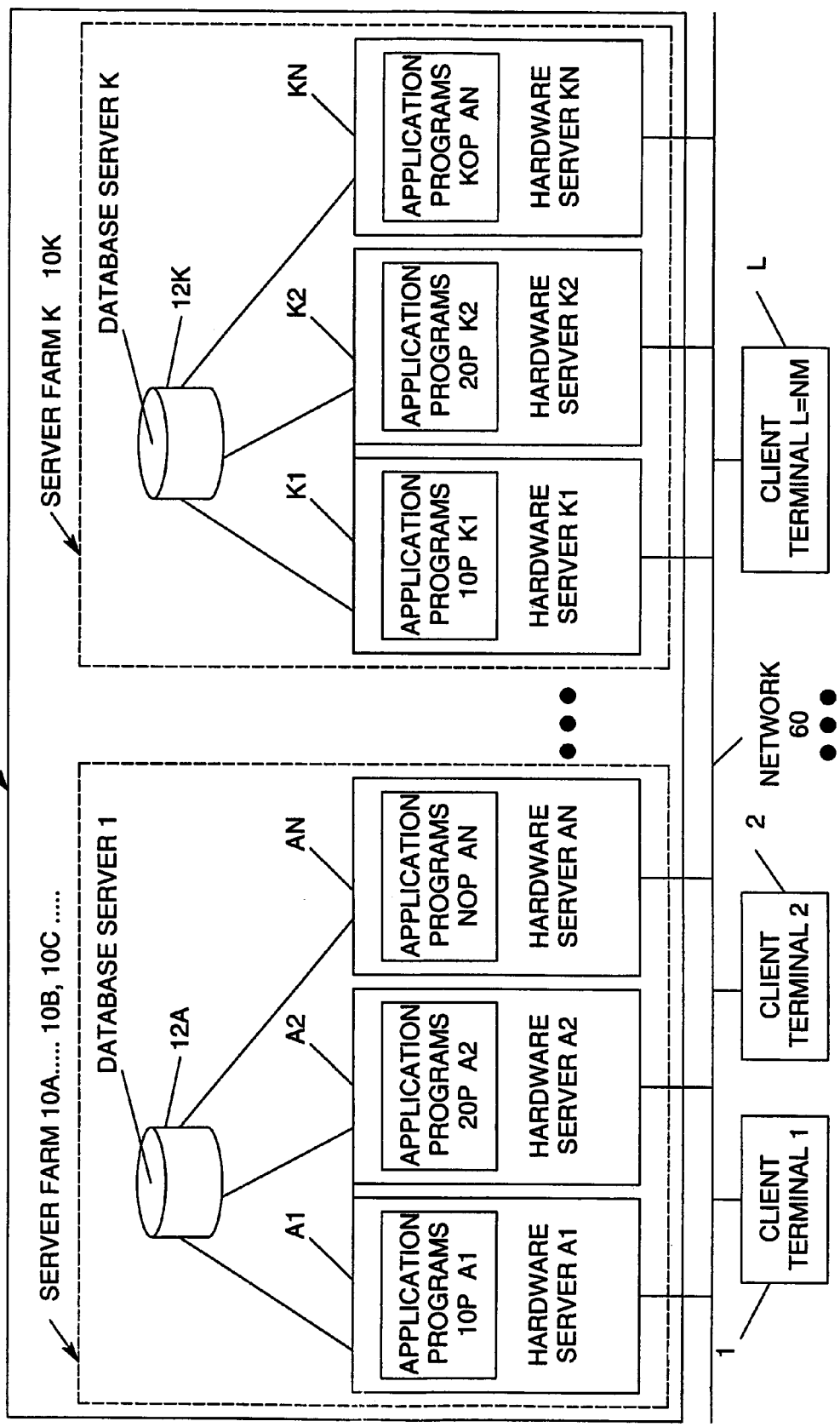

E-@CTION APPLICATION DELIVERY SOLUTION CONFIGURATOR

FILE   VIEW   HELP

READY               CAPS   11/6/2000   11:41AM

*FIG. 3*

CURRENT CUSTOMER OVERVIEW

[+] ....... CHICAGO SITE
[-] ....... LOS ANGELES SITE
   [-] ....... MS OFFICE SERVER FARM
   [+] ....... DEVELOPERS
   [+] ....... SUPPORT PERSONNEL
   [-] ....... PAYROLL SERVER FARM
   [+] ....... TELEMARKETING REPS

E-@CTION APPLICATION DELIVERY SOLUTION CONFIGURATOR

FILE  EDIT  VIEW  WINDOW  HELP

CONFIG 1

| NETWORK UTILIZATION | DISK CAPACITY | LICENSES |
|---|---|---|
| BASE SOLUTION | AVAILABILITY | OPTIONAL SOFTWARE |
| INTRODUCTION | INTERVIEW | CUSTOMER DATA |

SITES

A SITE IS THE PHYSICAL LOCATION WHERE THE WINDOWS TERMINAL SERVER(S) WILL BE LOCATED SUCH AS LOS ANGELES OR CHICAGO.

PLEASE FILL IN THE FOLLOWING INFORMATION FOR EACH OF THE CUSTOMER'S SITES.

| | SITE NAME | LOCATION | NO OF USERS |
|---|---|---|---|
| 1 | CHICAGO | 5550 MAIN STREET | 500 |
| 2 | LOS ANGELES | 123 SOUTH BOOKSTONE STREET | 1000 |

[VIEW]  [<BACK]  [NEXT>]  [HELP]

READY    CAPS    11/6/2000    11:41AM

E-@CTION APPLICATION DELIVERY SOLUTION CONFIGURATOR

FILE   EDIT   VIEW   WINDOW   HELP

METAFARM SIZING FOR SITE LOS ANGELES

THIS PAGE WILL HELP SUBDIVIDE LARGE SITES OR FARMS INTO SMALLER, MANAGEABLE-SIZED FARMS. THESE RECOMMENDATIONS SHOULD BE USED IN THE INTERVIEW PROCESS TO FURTHER DEFINE A CUSTOMER'S CONFIGURATION SIZING REQUIREMENTS.

INPUT PARAMETERS

TOTAL CONCURRENT USERS  1000

AVAILABILITY GOAL  99.99  ▶

SERVER PREFERENCE  ES7000-4X(700 MHZ, W2K)  ▶

TYPICAL USER
○ SUPER HEAVY (WORST CASE)
◉ HEAVY
○ MEDIUM
○ LIGHT (BEST CASE)

PRINT

RECALCULATE     OK     CANCEL

READY          CAPS    11/6/2000   11:41AM

FIG. 9A

E-@CTION APPLICATION DELIVERY SOLUTION CONFIGURATOR

FILE  EDIT  VIEW  WINDOW  HELP

METAFARM SIZING FOR SITE LOS ANGELES

FARM SUBDIVISION RECOMMENDATIONS

| | |
|---|---|
| NUMBER OF FARMS | 1 |
| USERS PER FARM | 1000 |
| ESTIMATED AVAILABILITY | 99.99179 |
| ESTIMATED DOWNTIME (HRS/YR) | 0.72 |
| REDUNDANT PARTITIONS (25%) | 2 |
| TOTAL PARTITIONS | 10 |

CLICK OK TO RETURN TO THE INTERVIEW PROCESS WITH THE SELECTED FARM SUBDIVISION RECOMMENDATION MERGED INTO THE INTERVIEW SESSION. THE COLUMN INITIALLY SELECTED REPRESENTS THE CONFIGURATOR'S HIGHEST RECOMMENDATION.

[ RECALCULATE ]     [ OK ]   [ CANCEL ]     [ PRINT ]

READY     CAPS    11/6/2000   11:41AM

E-@CTION APPLICATION DELIVERY SOLUTION CONFIGURATOR

FILE   EDIT   VIEW   WINDOW   HELP

SERVER FARM FOR LOS ANGELES

DESCRIPTION | FEATURES/CAPABILITIES

DESCRIPTION OF THE SERVER FARM

ENTER OR SELECT SERVER FARM NAME: META-SUBFARM001 ▶

RENAME SERVER FARM     DELETE SERVER FARM

PRIMARY ROLE OF THE SERVER FARM: OTHER ▶

CONCURRENT NUMBER OF USERS: 1000
(I.E. - NUMBER OF USERS ACTIVELY PROCESSING SIMULTANEOUSLY ON THE SERVER FARM)

OK    CANCEL    APPLY    HELP

READY                               CAPS   11/6/2000   11:41AM

E-@ACTION APPLICATION DELIVERY SOLUTION CONFIGURATOR

FILE   EDIT   VIEW   WINDOW   HELP

SERVER FARM FOR LOS ANGELES

DESCRIPTION                                             FEATURES/CAPABILITIES

DESCRIPTION OF THE SERVER FARM

ENTER OR SELECT SERVER FARM NAME:   MS OFFICE   ▶

*NEW*
PRIMARY ROLE OF THE SERVER FARM:    APPLICATION SERVER   ▶

CONCURRENT NUMBER OF USERS:         800

(I.E. - NUMBER OF USERS ACTIVELY PROCESSING
SIMULTANEOUSLY ON THE SERVER FARM)

OK       CANCEL       APPLY       HELP

READY                                   CAPS   11/6/2000   11:41AM

E-@CTION APPLICATION DELIVERY SOLUTION CONFIGURATOR

FILE   EDIT   VIEW   WINDOW   HELP

SERVER FARM FOR LOS ANGELES

DESCRIPTION | FEATURES/CAPABILITIES

FEATURE/CAPABILITY OPTIONS FOR THE SERVER FARM

IF ANY OF THE FOLLOWING OPTIONS ARE CHECKED, THE CITRIX METAFRAME ADD-ON WILL BE REQUIRED.

PLEASE CHECK ALL FEATURES/CAPABILITIES THAT ARE NEEDED:

☐ CLIENT ENHANCEMENTS - TAPI SUPPORT
☐ CLIENT ENVIRONMENT SUPPORT - DOS
☐ CLIENT ENVIRONMENT SUPPORT - JAVA
☐ CLIENT ENVIRONMENT SUPPORT - MACINTOSH
☐ CLIENT ENVIRONMENT SUPPORT - UNIX

OK    CANCEL    APPLY    HELP

READY                              CAPS   11/6/2000   11:41AM

FIG. 17A

E-@CTION APPLICATION DELIVERY SOLUTION CONFIGURATOR

FILE   EDIT   VIEW   WINDOW   HELP

MS OFFICE SERVER FARM FOR LOS ANGELES

ASSIGN APPLICATION TYPES | DEFINE APPLICATION TYPES

APPLICATION DEFINITION

ENTER OR SELECT APPLICATION NAME: MS ACCESS 97 ▶

DISK SPACE REQUIRED FOR INSTALLATION: 40 MB

MEMORY REQUIRED BY APPLICATION: 8 MB

PLEASE SELECT ONE OF THE FOLLOWING ENVIRONMENT OPTIONS

◉ 32-BIT APPLICATION   ○ 16-BIT APPLICATION   ○ MS-DOS APPLICATION   [ DETAILS>> ]

[ OK ]   [ CANCEL ]   [ APPLY ]   [ HELP ]

READY | CAPS | 11/6/2000 | 11:41AM

FIG. 17B

E-@CTION APPLICATION DELIVERY SOLUTION CONFIGURATOR

FILE  EDIT  VIEW  WINDOW  HELP

MS OFFICE SERVER FARM FOR LOS ANGELES

ASSIGN APPLICATION TYPES | DEFINE APPLICATION TYPES

PLEASE SELECT AN OPTION FROM EACH OF THE FOLLOWING CATEGORIES THAT BEST REFLECT THE APPLICATION'S USAGE.

APPLICATION INPUT
- ◉ GUI-BASED
- ○ MOSTLY TEXT-BASED

APPLICATION PROCESSING
- ○ LIGHT BACKGROUND PROCESSING
- ◉ HEAVY BACKGROUND PROCESSING

APPLICATION OUTPUT
- ◉ MOSTLY TEXT-BASED
- ○ GRAPHIC-BASED
- ○ ANIMATED GRAPHIC-BASED

[ OK ]  [ CANCEL ]  [ APPLY ]  [ HELP ]

READY | CAPS | 11/6/2000 | 11:41AM

E-@CTION APPLICATION DELIVERY SOLUTION CONFIGURATOR

FILE   EDIT   VIEW   WINDOW   HELP

MS OFFICE SERVER FARM FOR LOS ANGELES

CONCURRENT USERS

DISK SPACE

CONCURRENT USER ASSIGNMENT

PLEASE DISTRIBUTE THE 750 CONCURRENT USERS ASSIGNED TO THE MS OFFICE SERVER FARM AMONG THE FOLLOWING APPLICATIONS AS A REPRESENTATION OF THE ACTIVE PROCESSING OCCURRING DURING AN OVERTIME PERIOD.

|  | DEVELOPERS | SUPPORT PERSONNEL |
|---|---|---|
| MS ACCESS 97 | 75 | 300 |
| MICROSOFT INTERNET EXPLORER 5.0 | 75 | 300 |

[OK]   [CANCEL]   [APPLY]   [HELP]

READY            CAPS   11/6/2000   11:41AM

FIG. 19

E-@CTION APPLICATION DELIVERY SOLUTION CONFIGURATOR

FILE  EDIT  VIEW  WINDOW  HELP

MS OFFICE SERVER FARM FOR LOS ANGELES

CONCURRENT USERS

DISK SPACE

DISK SPACE ASSIGNMENT

UNDER EACH USER TYPE, PLEASE ENTER THE TOTAL AMOUNT OF DISK SPACE REQUIRED IN MB FOR ALL USERS RUNNING EACH OF THE FOLLOWING APPLICATIONS.

|  | DEVELOPERS | SUPPORT PERSONNEL |
|---|---|---|
| MS ACCESS 97 | 125 | 500 |
| MICROSOFT INTERNET EXPLORER 5.0 | 125 | 500 |

OK   CANCEL   APPLY   HELP

READY                CAPS   11/6/2000   11:41AM

FIG. 20

E-@CTION APPLICATION DELIVERY SOLUTION CONFIGURATOR

FILE  EDIT  VIEW  WINDOW  HELP

C:\PROGRAM FILES\TCSIZING\PATENTCONFIG11-9.TSC

| NETWORK UTILIZATION | | DISK CAPACITY | | LICENSES | |
|---|---|---|---|---|---|
| BASE SOLUTION | AVAILABILITY | | | OPTIONAL SOFTWARE | |
| INTRODUCTION | INTERVIEW | | | CUSTOMER DATA | |

AVAILABILITY CALCULATOR

SITE: ▶ LOS ANGELES    SERVER FARM: ▶ MS OFFICE

SERVER: ▶ ES2044 (550 MHZ) PENTIUM III XEON WITH R PROCESSORS AND WINDOWS NT

| SCENARIO | 1 | 2 | 3 | 4 |
|---|---|---|---|---|
| ADJUSTED CONCURRENT NUMBER OF USERS | 626 | 626 | 626 | 626 |
| SYSTEM REPAIR TIME (HOURS) | 6 | 6 | 6 | 6 |
| REDUNDANCY FACTOR (%) | 25 | 20 | 15 | 10 |
| ESTIMATED NUMBER OF SERVERS | 10 | 9 | 9 | 8 |
| ESTIMATED PEAK NUMBER OF USERS | 880 | 792 | 792 | 704 |

[ ESTIMATE ]   [ PRINT ]   [ RESET ]

READY    CAPS   11/6/2000   11:41AM

E-@CTION APPLICATION DELIVERY SOLUTION CONFIGURATOR

FILE   EDIT   VIEW   WINDOW   HELP

C:\PROGRAM FILES\TCSIZING\PATENT\CONFIG11-9.TSC

| NETWORK UTILIZATION | | DISK CAPACITY | | LICENSES | |
|---|---|---|---|---|---|
| BASE SOLUTION | | AVAILABILITY | | OPTIONAL SOFTWARE | |
| INTRODUCTION | | INTERVIEW | | CUSTOMER DATA | |

AVAILABILITY CALCULATOR

SITE: LOS ANGELES ▶   SERVER FARM: MS OFFICE ▶

SERVER: ES2044 (550 MHZ) PENTIUM III XEON WITH R PROCESSORS AND WINDOWS NT ▶

| SCENARIO | 1 | 2 | 3 | 4 |
|---|---|---|---|---|
| ESTIMATED NUMBER OF REDUNDANT SERVERS | 2 | 1 | 1 | 0 |
| ESTIMATED SERVER FARM MTTF (HOURS) | 73,069 | 3,616 | 3,616 | 150 |
| ESTIMATED AVAILABILITY (%) | 99.9918 | 99.8341 | 99.8341 | 96 |
| ESTIMATED DOWNTIME (HOURS/YEAR) | 0.72 | 14.53 | 14.53 | 350.4 |

[ESTIMATE]   [PRINT]   [RESET]

READY   CAPS   11/6/2000   11:41AM

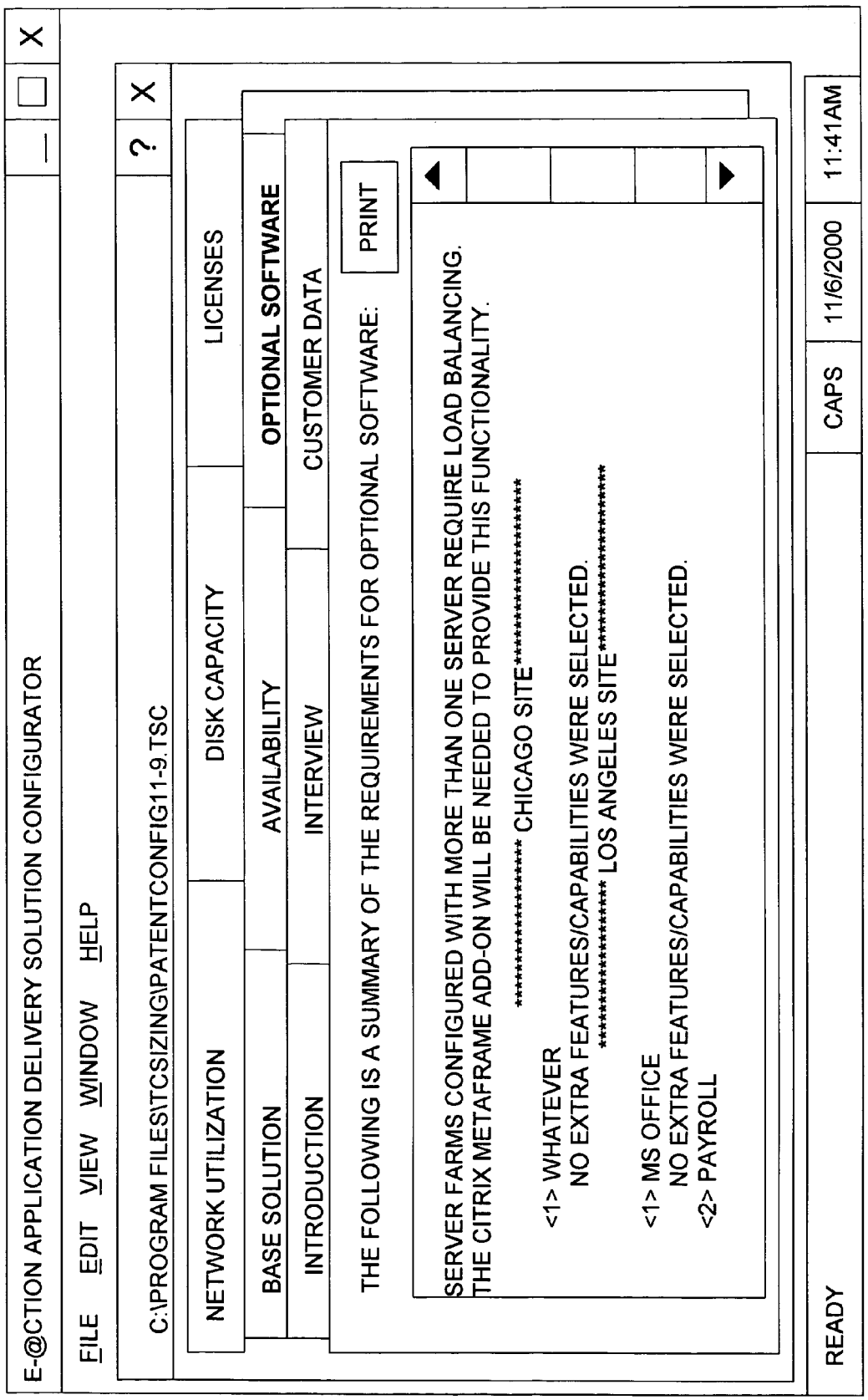

THIN CLIENT SIZING TOOL FOR ENTERPRISE SERVER FARM SOLUTION CONFIGURATOR

FIELD OF THE INVENTION

This disclosure relates to methods of gathering information regarding a customer's requirements and then using developed methods for configurating the size, the type of servers, and memory facilities which will optimize a design configuration for the particular situation of a given customer or User.

CROSS-REFERENCES TO RELATED APPLICATIONS

This application is related to co-pending applications designated hereinbelow and which are all included herein by reference.

U.S. Ser. No. 09/813,671, entitled "CONFIGURATION INTERVIEW SESSION METHOD FOR THIN CLIENT SIZING TOOL";

U.S. Ser. No. 09/813,672, entitled "METAFARM SIZER CONFIGURATION OPTIMIZATION METHOD";

U.S. Ser. No. 09/813,670, entitled "SOLUTION GENERATION METHOD FOR THIN CLIENT SIZING TOOL";

U.S. Ser. No. 09/813,668, entitled "METHOD FOR CALCULATING USER WEIGHTS FOR THIN CLIENT SIZING TOOL";

U.S. Ser. No. 09/813,669, entitled "METHOD FOR CALCULATING MEMORY REQUIREMENTS FOR THIN CLIENT SIZING TOOL";

U.S. Ser. No. 09/443,926, entitled "METHOD FOR ESTIMATING THE AVAILABILITY OF AN OPERATING SERVER FARM";

U.S. Ser. No. 09/474,706, entitled "METHOD FOR SERVER FARM CONFIGURATION OPTIMIZATION";

U.S. Ser. No. 09/705,441, entitled "METHOD FOR SERVER METAFARM CONFIGURATION OPTIMIZATION".

BACKGROUND OF THE INVENTION

In the developing world of computer networks and data communication networks, and especially those involved with Enterpriser Server situations, many different types of problem situations are presented to a designer, proposal-maker, and configurator of Server Farm facilities having the purpose of the layout, design and configuration of computer server facilities for meeting the specialized requirements of a particular customer and doing so in an optimizing fashion.

Earlier attempts at configurating and optimizing Enterprise Server systems for different customers involved considerable guesswork and trial-by-error methods in trying to determine the best solution for their customer. Many times the customer is not exactly sure what his present and future requirements will be, and he must be led through a series of interviews and communication processes to establish parameters for his intended network operations.

With the accumulation of large amounts of data and information, then some orderly arrangement would be desirable in order to collect and manage this information in order to configure a particular Server Farm system, its memory capability and other requirements which will be useful to provide the optimum delivery of services to the customer, and yet with the minimum amount of cost, price and downtime which might occur.

Earlier methods involved the making of educated or approximate guesses in regard to subdividing large sites into reasonably-sized Server Farms. To overcome this uncertainty, it is now possible to have methods which will provide guidelines with a higher degree of certainty than previously known. As a result, there can be provided a method for calculating a primary-based solution, which indicates the appropriate number of servers, the amount of disk space requirements, and the volume of memory requirements. Earlier-used methods often relied on approximations, estimations, and trial-by-error configurations.

Another area which was often neglected in the prior art methods of estimation, involved the idea of "User weights" which were mostly ignored, but now can be further identified in terms of light, medium, heavy, and super heavy Users regarding the types of applications involved, the type of personnel using these applications and the computer facilities provided. As a result, a greater degree of specificity is now capable of being developed which can then foretell a solution with a greater degree of accuracy. These "weighting" parameters help to assess the amount of stress or processor use which are imposed by different User-types and different applications on a server.

Another area of specificity which had been unknown or ignored in past estimations, was that of determining the level of stress or usage involved in different User-types and different applications as they impact on the network operations. Thus, the idea of utilizing and giving a rating to different application attributes and putting them in defined categories, will now be found to aid in greater accuracy in developing a configuration sizing design. Thus, much of the guesswork of previous design estimates are eliminated in order to develop a more accurate configuration solution.

Another useful aspect is to further determine the amount of disk space capacity and also the volume of memory requirements that will be necessary for appropriate operation of the configuration designed for the particular requirements of a given customer or User.

SUMMARY OF THE INVENTION

The present method and system provides a more certain and accurate series of operations and algorithmic steps which can be used to provide an Enterprise Server configuration solution which is specifically configured in order to meet the necessary requirements for a specific customer who has been able to state his requirements and goals. The method involves a preliminary interview process with the customer in order to gather information on the location and name of the various site locations involved, the types of applications needed, the types of servers acceptable, the characteristics of the types of Users involved and their program stresses. Then, further information is accumulated as to whether the input characteristics of the desired applications are text or GUI based, whether the output characteristics of the desired applications are text-based, graphics-based, or animated graphics-based, and whether the applications perform background processing or not. Benchmark parameters have been developed with regard to these application characteristics.

The total customer information is used to make a customer profile to provide input to an algorithm which will output a configuration solution for that particular User or customer. This includes developing the associated requirements for disk and memory volume.

Then, a final solution report and display is generated regarding each site involved, its availability factor, the estimated downtime period which might be expected.

The report additionally can show any optional software required and any specialized add-ons which might be needed for load balancing.

BRIEF DESCRIPTION OF THE DRAWINGS

FIG. 2 is a drawing of a typical Server Farm;

FIG. 3 is a window illustrating the main window for the Thin Client Sizer.

FIG. 6 is a window for current customer overview which shows the various site locations and the type of Server Farms, Users, and applications involved;

FIG. 7 is a window to develop the site's interview categories for loading particular information as to location and number of Users;

FIG. 9A is a window allowing for basic parameters to be input in order to provide an estimation or recommendation in FIG. 9B for the optimum server farm subdivision for Metafarms and for the application of this recommendation into the interview window shown as in FIG. 10A;

FIG. 10A is a window showing the results of applying the Metafarm subdivision recommendation formed in FIG. 9B and allows for modification or clarification of some of the applied parameters with regard to more descriptive server farm names, primary roles, and, if necessary, the number of users for each individual farm;

FIG. 10B is a window for the Server Farm's definition form-description tab which describes individual Server Farm names, the primary roles of the application server farms, and the number of concurrent Users for each server;

FIG. 11 is a window showing the Server Farm's definition form—Optional Software tab to indicate whether there is an extra need for a Citrix MetaFrame add-on and to indicate additional features/options that are necessary to fulfill the customer's needs;

FIG. 17A is a window showing the application type's definition form—Define Application Types tab, which will allows the User to either define a new application's characteristics or update an existing application's characteristics including memory and disk installation requirements, environment classification and FIG. 17B shows application input, output and processing attributes;

FIG. 19 is a window illustrating the User-to-Application Relationship form—Concurrent User Assignment tab, which requires the customer to input a numerical figure indicating the number of each user type Users that will be using the different application programs which were defined in previous Figures;

FIG. 20 is a window showing the User to Application Relationships form—Disk Space tab, which will indicate the additional disk space required of each set of user types and application types that were defined for the server farm in previous figures;

FIGS. 24A, 24B are windows showing the server Availability tab which will contain information on the best solution to handle a customer's expectations depending on the desired availability factor and provides a method to calculate or estimate requirement changes when considering customer growth and other such factors;

FIG. 25 is a window showing the Optional Software tab which will describe the additional software/features required for the customer and the Citrix MetaFrame add-ons which may be required to meet a customer's needs;

GLOSSARY LIST OF RELEVANT ITEMS

Figure 1A:
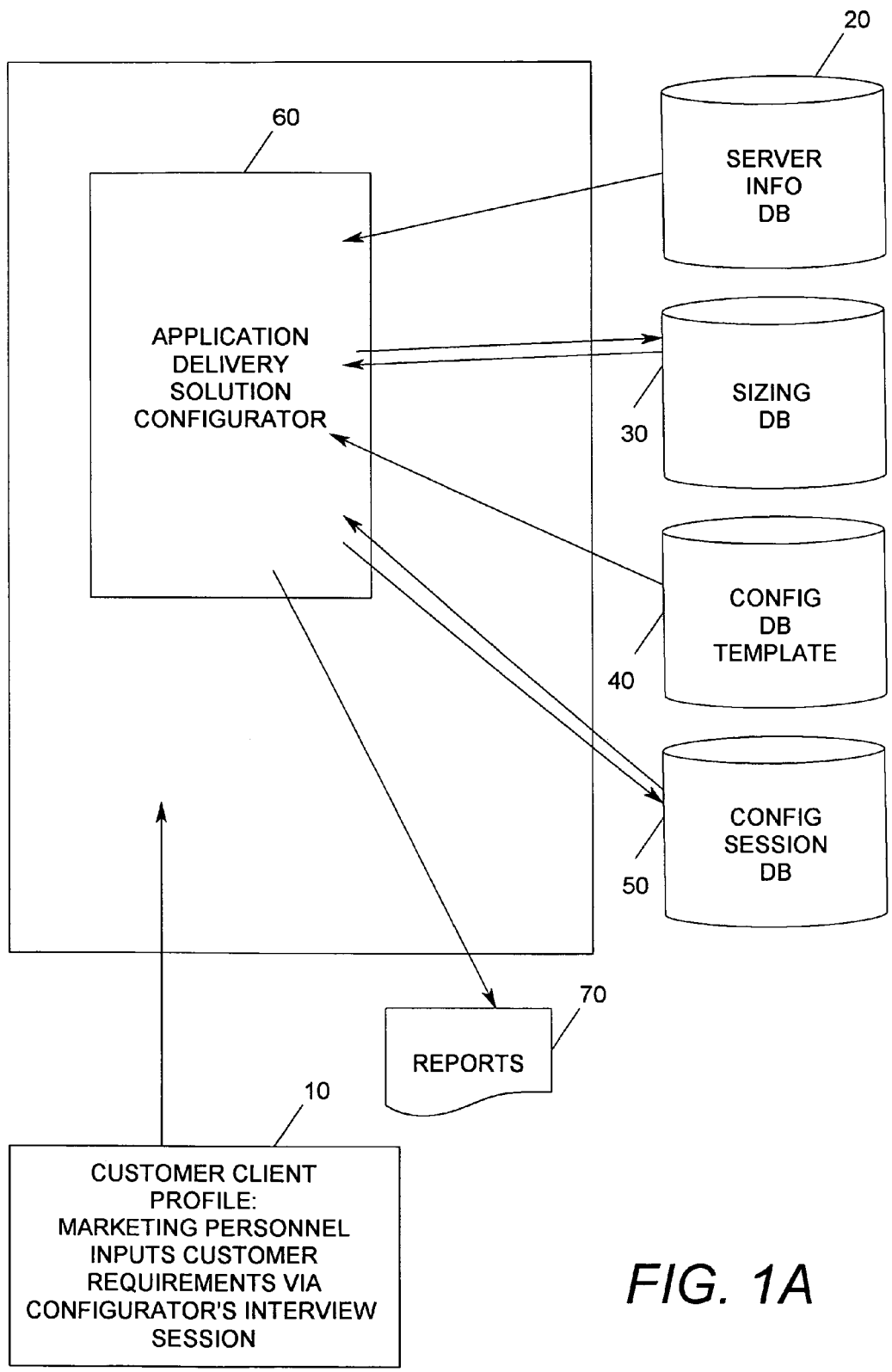
FIG. 1A is a drawing illustrating an environmental diagram indicating the various elements and modules involved in the subject Thin Client Solution Configurator.

1. ADJUSTED USER TOTAL (SERVER FARM): The normalized total number of Users that will be supported by the SERVER FARM. Unadjusted Users are grouped into 4 distinct usage-pattern categories, namely (a) Light, (b) Medium, (c) Heavy, and (d) Super Heavy. Calculations are performed on the number of Users in each grouping to determine the normalized number of Users. These normalized numbers are then summed to establish the ADJUSTED USER TOTAL for the entire SERVER FARM.

2. APPLICATION DELIVERY SOLUTION CONFIGURATOR: This is the Unisys approved and recognized designation of the present method and system as defined by this invention. This is a Windows application that helps one in choosing the best-developed Application Delivery (Thin Client) server solution that will meet a client's requirements. This Solution Configurator guides one through a customer interview session where information is gathered in order to develop a set of solutions that will match the customer's performance requirements but also provide different availability levels suitable to the customer-client.

3. APPLICATION SERVER: This is the intended use or responsibility of one of the designated server farms. This type of server farm would run computer programs or pieces of software designed to perform specific multi-user tasks solely within the Windows Terminal Server systems making up the server farm. APPLICATION SERVERS would not be dependent on other back-end servers for the processing of data.

4. APPLICATION TYPE: This is one of four main interview categories used by the described Thin Client Sizer Tool for collecting customer information and collecting also Application Type documents involving the memory and the disk resources typically required when running an application. By supplying the Application Types that will be running—helps to size the Server Farm in order to sufficiently handle the client demand.

5. APPINPUT: GUI-based—This requires limited User input such as an application developed with Microsoft Visual Basic where selections are made from lists or by clicking various options. Text-based—Requires considerable typing by the User such as creating a document in Microsoft Word.

6. APPOUTPUT: Text-based—Indicates the kind of information presented by the application. For example, most Visual Basic or C++ windows and dialog boxes, most uses of productivity apps (Microsoft Office), terminal emulation, etc. Graphic-based—Indicates the kind of information presented by the application. For example, desktop publishing large documents with graphics, Web pages with a lot of picture content (JPEG files), scanned images (TIF files), Microsoft Encarta, etc.

7. APPPROCESSING: Light—Indicates the application executing on the terminal server does little more than present a GUI. For example, a Visual Basic application, the SAP thin client, light use of productivity apps (Microsoft Office), terminal emulation, etc. Heavy—Indicates the application executing on the terminal server uses more processor, memory or disk resource usage. For example, the Peoplesoft Thin Client, Outlook Exchange client, heavy use of productivity apps for complex tasks (desktop publishing, large documents with graphics, extremely large spreadsheets with complex cascading calculations, etc.)

8. AVAILABILITY: This is a measure of the readiness of the system and an application to deliver an expected service to the User with a required performance level. It may be described as a percentage of time that a system and an application are running as distinguished from the system being down for maintenance or repairs.

9. AVAILABILITY GOAL: This is the target service level as defined by the client for the server farm. This data value is input to the tool as a percentage of time that the client expects the systems and applications in the server farm to be accessible by all Users.

10. AVAILABILITY LEVEL TAB WINDOW (FIGS. 24A, 24B): This shows the Availability Calculator which helps to determine solutions that include future/growth potential requirements with a variety of redundancy levels. This screen is interactive and will take input for Adjusted Concurrent number of users, system repair times and redundancy levels. This screen is interactive and will take input for Adjusted Concurrent number of users, system repair times and redundancy levels and returns solution information such as estimated number of servers, # peak users, availability, estimated downtime, # redundant servers and server farm mean time to failure (MTTF).

11. BACKGROUND PROCESSING: The ability of a user-interactive software application to execute processing steps independent of the input and output actions. Background processing would include, but is not limited to, procedures such as 'always on' spell checking in a word processor or 'always on' calculations in a spreadsheet.

12. BENCHMARK: This is test of computer performance and consists of a test or set of tests used to measure the performance of an individual e-Action ES Terminal Server. The output from these tests consists of a value designated as the total number of Users that each e-Action ES Terminal Server system can reasonably sustain and process.

13. BASE SOLUTIONS TAB WINDOW (FIG. 23): Reports the minimum server configuration recommendation (i.e., not including additional redundnacy or growth considerations) for each of the customer Site's server farms. A solution includes the number of servers/MHz required, Operating system, # processors and GB RAM for each server type supported by Unisys.

14. CITRIX METAFRAME: This is computer software from Citrix Systems, Inc., headquartered in Ft. Lauderdale, Fla. This METAFRAME software is loaded onto each Windows Terminal Server and provides superior enterprise-level management and control functions for the e-@ction Enterprise Servers.

15. CITRIX METAFRAME ADD-ONS: ICA Secure and Load Balancing Services are two optional computer softwares that can be run simultaneously with CITRIX METAFRAME on a Terminal Server. ICA Secure provides enhanced network security for METAFRAME. Load Balancing Services allow Citrix MetaFrame to distribute application processing to the plurality of computer systems in a server farm.

16. CONCURRENT USERS: This number is an estimate of the maximum number of users simultaneously processing applications on a Server Farm at any given time. This is characteristically a percentage of the total Benchmark users that can be sustained on all of the e-@ction Enterprise Servers in the Server Farm.

17. CONFIGURATION DATABASE TEMPLATE: This is a collection of data on a computer applied during the information collection process and utilized for the assembly of information collected from window screens.

18. CONFIGURATION SESSION: This is the vehicle used by the described Thin Client Sizer Tool to collect the information on a customer's sizing requirements and to generate the best solution to meet those requirements.

19. CONFIGURATION SESSION DATABASE: This is a collection of data on a computer used for providing information to an instance of the Application Delivery Solution Configurator that enables algorithmic steps and calculations to be applied in the development of an optimized configuration for the Server Farm.

20. CONFIGURATOR: See APPLICATION DELIVERY SOLUTION CONFIGURATOR.

21. CUSTOMER DATA TAB WINDOW (FIG. 22): Reports back to the customer the information that was collected during the interview session and that which the solution generation was based on.

22. CUSTOMER PROFILE: This is a collection of data describing the customer's characteristics and attributes and assembled from the customer interview. This data is input to an algorithm which will output a configuration solution for that particular User or customer.

23. DEFAULT AVAILABILITY: The four (4) SERVER FARM initial availability level scenarios as calculated and displayed by the AVAILABILITY CALCULATOR. The availability levels for the Server Farm are calculated based on the following three parameters: (1) the number of adjusted concurrent users, (2) the system repair time, and (3) the REDUNDANCY FACTOR. For the four DEFAULT AVAILABILITY levels, the first parameter is calculated based on the sizing of the SERVER FARM, and the latter two parameters have pre-configured values, as chosen by the Engineering Group, where the second parameter is held constant at 6 hours and the second parameter is varied from 25% to 10% in decrements of 5%.

24. DISK CAPACITY TAB WINDOW (FIG. 27): Reports on the disk capacity requirements determined by the interview session input and solution generation algorithms for each of the customer Site's Server Farms.

25. DOWNTIME: The downtime or repair time for a single application server is the time interval required to restore the server and system back to normal business operation. At the end of the repair period, the applications running on the repaired server are available to Users. The downtime for a Server Farm is the time interval required to restore the nominal Server Farm performance.

26. e-@CTION ENTERPRISE SERVER (ES): This is the specific name for a plurality of server models marketed and sold by Unisys Corporation. Current models include ES7000, ES5000, and ES2000 systems.

27. ESTIMATOR PROGRAM: This is a program which performs method steps for estimating system parameters such as the availability of an application program to run on any computer or server in the cluster of at least two servers or computers. This type of estimator program was the subject of a co-pending application U.S. Ser. No. 550,603 which is incorporated herein by reference. Another estimator program is the subject of this patent application.

28. ETO: This represents engineering technology optimization and involves an organization located at a specific company location that is devoted to optimizing the performance of the Enterprise-class Windows NT Server platforms.

29. FAILOVER: This is a mode of operation in the system which has two or more servers or computers wherein a failure in one of the servers or computers will result in transfer of operations to the other or another one of the still operating servers and computers. Failover time is the period of time required for successful transfer from a failed server to an operative server.

30. INPUT CHARACTERISTICS: These attributes describe how input is provided to the customer's software applications—through textural typing, through GUI based screen manipulation, or through a combination of both methods.

31. KBPS REQUIREMENTS (SERVER FARM): This is the total data transmission capacity (or bandwidth), measured in kilobytes per second (Kbps), which will be needed for all bi-directional communication between the Users' concurrent connections and the SERVER FARM(s).

32. MB (MEGABYTE): A unit of computer memory or disk storage space equal to 1,048,576 bytes.

33. MEAN TIME TO FAILURE (MTTF): This is the average operating time between two failures, that can be estimated as the total operating time divided by the number of failures.

34. MEAN TIME TO REPAIR (MTTR): This is the average "downtime" in case of failure, that can be estimated as the total downtime divided by the number of failures.

35. MEMORY REQUIREMENTS: This is the necessary amount of server memory used by each User's instance of the multi-user software application.

36. NETWORK CAPACITY TAB WINDOW (FIG. 26): This is called Network Utilization now; reports on the estimated network activity measured in Kbps for each of the customer Site's Server Farms.

37. OUTPUT CHARACTERISTICS: These attributes describe how output is derived from the customer's software applications—through the display of visual information as text, as graphics, as animated graphics, or as a combination of one or more methods.

38. OPTIMIZATION CRITERION: This is a function that determines the value of one of the essential system attributes and must be minimized (or maximized) by variation of one or more system parameters that are chosen as OPTIMIZATION PARAMETERS. Each optimization parameter should have a predefined domain that defines the values that the optimization parameter may assume. The OPTIMIZATION CRITERION is a focus of an optimum system design or configuration. The examples of the optimization criteria are system performance, system availability, and cost of ownership.

39. OPTIONAL SOFTWARE TAB WINDOW (FIG. 25): Reports on the additional features/capabilities entered in the interview session regarding the customer's profile for each of the Site's Server Farms. Optional software requirements include such categories as Client Connection Methods, Enhancements, Environment support, Multimedia capabilities, Display characteristics, Protocol support, and Server Enhancements.

40. PROCESSING CHARACTERISTIC: This attribute describes whether the customer's software application performs extensive BACKGROUND PROCESSING, independent from the processing of application input and output.

41. REDUNDANCY FACTOR (Rf): This is a measure of the additional number of Users that can be added to the nominal number of Users per server without exceeding the maximum number of Users per server (server performance benchmark maximum of Users). It is a difference between maximum and nominal performance as a percentage of the maximum performance. The Redundancy Factor can be calculated as 100 percent minus a usage factor Uf.

42. SERVER CONFIGURATION REPORT: This is a report generated by the Thin Client Sizer Tool that will contain the information on the optimum server configurations as determined by the customer information which was collected during the Configuration Session and the performance benchmarking results.

43. SERVER FARM: This is one of the five main interview categories used by the Thin Client Sizer Tool for collecting customer information. A Server Farm consists of one or more Windows Terminal Servers configured together for unified administration, security, and for communication services. For instance, two Server Farms might be required for certain applications such as the PeopleSoft clients, or one server for a Payroll function, and another server for a Human Resources function.

44. SERVER FARM AVAILABILITY CALCULATOR: This is an estimator program that estimates the availability for the Server Farm.

45. SERVER FARM OVERFLOW: The condition whereby the results of calculations on the number of servers in a SERVER FARM, during the Solution Generation phase, exceeds the maximum number of servers recommended for a SERVER FARM as determined by the Engineering Group.

46. SERVER INFORMATION DATABASE: This is a collection of data on a computer for holding benchmark and informational data on a plurality of Unisys Enterprise Server systems. This data is used by the Thin Client Sizing Tool in determining the optimum server farm configuration to meet the customer's sizing requirements.

47. SITE: This is one of the five main interview categories used by the Thin Client Sizer Tool for collecting customer information. A Site is the physical location where the Windows Terminal Servers will be located in particular cities such as, New York, Los Angeles or Chicago, etc. and the number of users at that physical location.

48. SITE/SERVER FARM PAIR: This is a defined combination of a specific Server Farm residing within a particular physical location. As defined during the customer interview, each physical location, or site, can contain one of more Server Farms. When defining the User and Application characteristics of each Server Farm within the site, each individual combination is considered as an independent pair.

49. SIZING DATABASE: This is a collection of data on a computer output from the THIN CLIENT SERVER FARM AVAILABILITY CALCULATOR and used for storing the number of e-@ction Enterprise Server unit modules and their availability levels.

50. SOLUTION CONFIGURATOR: See APPLICATION DELIVERY SOLUTION CONFIGURATOR.

51. SOLUTION GENERATION: The act of producing a particular SERVER FARM configuration (i.e. the SOLUTION) that will meet the sizing and availability requirements of a client. This SOLUTION will be comprised of an appropriate number of servers, proper disk space and memory to meet the client requirements.

52. THIN CLIENT SERVER FARM AVAILABILITY CALCULATOR: This is one of the examples of the SERVER FARM AVAILABILITY CALCULATOR. Because Thin Client configurations are intended to make applications available to multiple Users at the same time, this calculator calculates the availability of a specified number of instances of an application (not just a single instance) where each application instance is being run at the server, but all the User input response is taking place at the client terminal. In this scenario, downtime occurs whenever the number of available instances of the application drops below the required specified number of instances.

53. UCON32: This is the unit designated as the Unisys Configurator which is an extensive on-line configuration tool which is used to support all Unisys Corporation system platforms.

54. USAGE FACTOR (Uf): This is the ratio of the nominal number of Users per server to the maximum number of Users per server (server performance benchmark maximum of Users) times 100 percent.

55. USER-TYPE: This is one of the five main interview categories used by the Thin Client Sizer Tool for collecting customer information. A User-Type embodies the usage patterns of a particular group of Users. User usage patterns will have a significant impact on performance. The area which is considered here is the user's typing speed. Some examples of User-types are, order entry clerks, secretaries, developers, and technical writers.

56. USER WEIGHT: This is the estimated average user impact (light, medium, heavy or super heavy) on the Windows Terminal Server, and a value is assigned to each User Type by the sizing tool. Such User attributes as typing speed or application familiarity can all affect this parameter. It is used to approximate the amount of server processor usage that is imposed by the different User Types.

57. WINDOWS TERMINAL SERVER: This is the designation for an e-@ction Enterprise Server that is running one of two operating systems sold and supported by Microsoft Corporation: (1) Windows NT Server 4.0, Terminal Server Edition, or (2) Windows 2000 (Server, Advanced Server, or Datacenter Server) with the optional Terminal Services service enabled in Application Server mode.

DESCRIPTION OF PREFERRED EMBODIMENT

The present method and system can also be called the e-@ction Application Delivery Solution Configurator. This is a Windows application that helps one in choosing the best developed Thin Client server solution that will meet the customer's requirements. The solution configurator guides one through a customer interview where information is gathered in order to develop a set of solutions that will match the customer's performance requirements but also provide different availability levels suitable to the customer-client. The solutions are based on the following:

(i) The requirements needed to centralize and consolidate the customer's information technology environment;

(ii) The performance and the sizing requirements for the customer;

(iii) The Engineering Technology Optimization (ETO) e-@ction ES performance benchmarking results from test results in an Engineering Laboratory; Aquanta designates a particular series of Unisys Corporation's computer terminals;

(iv) Use of engineering reliability data on the e-@ction ES Systems;

(v) The support organization service package repair time.

Methodology: The solution configurator uses a new methodology which includes the following:

(a) Information collection and performance sizing with a minimal Server Farm availability level—at this stage the farm size is determined based on performance criteria;

(b) The Server Farm availability analysis with Server Farm size adjustment—at this stage an availability analysis based on "what if" scenarios which enables an availability comparison of the Server Farm configurations with a different number of redundant servers.

Solution Configurator Functions: The solution configurator consists of four major functions (i) a base configurator; (ii) a Metafarm Sizer, (iii) an availability calculator; and (iv) a reporter.

(i) Base Configurator: The Base Configurator is used to collect information about a customer's performance and sizing requirements. During the interview process one is prompted to obtain information on the following categories which include:
(a1) Site;
(a2) Server Farm;
(a3) User-types;
(a4) Application types;
(a5) User/Application Relationships.

Site: A site refers to the physical location of the Windows terminal servers, for example the site(s) may be in certain cities such as Philadelphia, Chicago, or Los Angeles, etc. Under this category one is required to enter the following information:

(a1a) The site name is a name that is unique and identifies a physical location;

(a1b) Location—the information provided here can be as simple as the name of the city where the Server Farm is located or can be even more detailed to give a street number, street name, state or country;

(a1c) The number of users—the total number of users that will be assigned to that particular site's Server Farms.

(b) Server Farm: A Server Farm consists of one or more Windows terminal servers configured together for ease of administration, security, and communication services.

A site can have multiple Server Farms with each one performing a separate function. Depending on the type of business, one Server Farm could be dedicated to business applications, as for example SAP, or PeopleSoft. Another Server Farm could be dedicated to process business support programs, for example as Office 2000.

For the Server Farm category one is required to enter the following:

(i) The name of the Server Farm. This must be a name which is meaningful and which depicts the function of the server, such as for example the item "Payroll."

(ii) The intended use of that Server Farm, for example as an "Application Server";

(iii) The maximum number of concurrent users. This number is an estimate of the maximum number of users processing applications on a Server Farm at any given time;

(iv) Optional features and capabilities that might be required, such as for example a Java support system or direct dial-up, or other system.

If a Metafarm subdivision recommendation is needed, a user may optionally request that a "quick" assessment as to the potential availability of a server farm can be made based on some basic parameters such as number of users, estimated average user weight (light, medium, heavy or super heavy), and the server type preferred. This assessment can be used to determine how to subdivide a large number of users into an optimal number of server farms.

User-Type: A user type refers to usage patterns of a group of users, such as managers, order entry clerks, secretaries, developers, technical writers, etc. This category will require the following types of information: (a) the types of users that will be running applications on the server, for example, administrators and sales personnel; (b) the typing speed of users, for example, as a user type estimated to type at an insignificant speed, between 35 and 40 words per minute (wpm) or at 45 words per minute or faster typing speed.

Application Type: The application type defines the input, processing, and output options that are typical to an application. These requirements are essential in sizing the Server Farm in order to handle the client demands. In this category, one is required to enter the following information:

(i) Application name, as an example—Microsoft Access;

(ii) Disk installation space and memory requirements;

(iii) The type of application environment, for example 32-bit, 16-bit, or MS-DOS, etc.

(iv) Input, processing, and output characteristics of an application.

User/Application Relationship: The user to application relationship interview category refers to the number of the concurrent user type Users defined for the Server Farm that will be using an application. This information is critical in determining the user weighting and adjusted number of users for the server farms and thus determine the educated/optimal configuration recommendation for the customer.

Availability Calculator: Availability is a measure of the readiness of the system and an application to deliver an expected service to the user. A Server Farm must always provide access to applications and data for a certain minimum number of users.

Failed farms can represent a significant business loss. A non-failed Server Farm can be defined as follows:—(i) a Server Farm has not failed if some of the users lose connections to the Server Farm but can reconnect and continue to work:—and the majority of users did not experience any interruption in their work. A Server Farm does, however, fail as soon as a Server Farm is unable to serve a specified minimum of users.

To provide high Server Farm availability, one is set to recommend farms having redundant servers. This approach is used widely to improve system availability beyond that of a Server Farm system in which size is determined only on performance criteria. With redundant servers, if one of the servers in the farm fails, the users connected to the server lose their connections but still have an opportunity to reconnect to the farm and continually access applications and data. If all the users can access their applications and data, the Farm is considered "available." If one user is unable to access application and data, this means that the farm redundancy was exhausted and the Server Farm has failed.

"What if" Scenarios: The Availability Calculator enables one to use various "what if" scenarios before deciding on the best availability solution for a customer. This process continues as follows:

1. The Calculator estimates the Server Farm availability and down time per year based on the base configurator result data and the repair time default value of the service contract plus redundancy factors.
2. One can assess various "what if" scenarios by changing some of the parameters that determine a Server Farm's availability. The Calculator will then do the following:
    (a) Re-calculate the Server Farm size, the availability, and down time per year based on one's "what if" requests.
    (b) Identifies system configurations that are candidates for a Server Farm Availability Level.

Parameters: The parameters that one can select and change include the type of server, the adjusted concurrent number of users, the service contract repair time, and the redundancy factor. It is to be noted that selecting another type of server causes the Calculator to use a new server reliability and application benchmark value.

Reporter: After one enters the information that is obtained during the interview, the Solution Configurator produces a report listing the optimum base server configurations. These configurations are based on the information one provided as input and the performance benchmarking results. This report will include the following information:
    (i) System Models;
    (ii) Type and number of processors;
    (iii) The amount of memory;
    (iv) High availability options;
    (v) Optional software such as MetaFrame, Load Balancing and ICA Secure;
    (vi) Network usage;
    (vii) Minimum disk capacity.

Benefits in Using The Solution Configurator: The Solution Configurator provides the following:
    (a) Complete solutions by consolidating hardware, software, network, and the licenses required by a customer.
    (b) The configuration required to meet certain performance and sizing requirements of a customer. This configuration is tuned to meet the customer's availability requirements.
    (c) An easy to use Windows graphical user interface guides one through a customer interview. The user interface includes a help facility that provides online information about the various fields in the dialog boxes.
    (d) A quick and accurate way to give immediate feedback to customers who are looking for Thin Client server based computer solutions—thus there is no more waiting while searching through several file servers or websites to gather and calculate the information.
    (e) A unique methodology that enables one to use "what if" scenarios to compare Server Farm availability for different Server Farms and to identify system configurations that are candidates for a developed Server Farm availability level.
    (f) A tool that enables one to demonstrate to a potential customer, a compelling reason for buying a Server Farm with more servers, and thus buying a higher availability level.

FIG. 1A is an environmental drawing to illustrate the basic modular arrangement involved in the present application delivery solution configurator. The data accumulation and customer-client information is indicated as being developed as the customer-client profile 10. The methods and algorithm steps are provided for by the block designated application delivery solution configurator 60.

Also available for input to the configurator program 60 is the server information database 20 and the configuration database template 40. Then additionally collected for two-way information transmission is the sizing database 30, and the configuration database 50.

Thus, the customer-client profile information 10 and other applicable information residing on the databases 20, 30, 40 and 50, are attached for inter-working with the application delivery solution configurator 60, after which when all the subsequent algorithmic steps are effectuated, then there will be a report unit 70 in which the optimum solution information is provided to the designer and the client customer for providing an optimized solution for the customer's enterprise or operating situation.

The Thin Client Sizer Tool is a Graphical Users Interface (GUI) based application which is used to specify a list of server configurations (Aquanta ES) that best satisfy a particular customer's requirements for deployment of a Windows Terminal Server and including Microsoft and Citrix software.

The Thin Client Sizer Tool is used to specify a list of different Aquanta ES server configurations that will best satisfy a customer's requirements for the deployment of the Windows Terminal Server. This includes the software from Microsoft and Citrix. This is to be used by marketing consultants and the applicable engineering technology optimization team.

It has been realized for some time that in order to facilitate the sizing efforts of a Thin Client sales force, it would be very beneficial that there be an automated tool to facilitate this sizing effort.

The Thin Client Sizer Tool will work to automatically configure the "optimum" Thin Client server solution which is based upon a customer's specific requirements and the engineering technology optimization for Aquanta ES performance benchmarking results.

In the prior art, this type of information was done manually to perform this type of sizing effort and involved the use of several different documents and the use of several different Websites. Since this is done manually, and all the required information is not readily available, this can require a significant amount of time and effort to perform this estimation and still can be subject to many errors.

The new Sizer Tool is a Graphical User Interface-based replacement of the formerly used manual process, thus to enable the users to increase their efficiency by creating more solutions easily and providing faster optimum server configurations.

The main goal of this tool is to provide an easy-to-read server configuration report which includes the system model, the processors, the memory, and cache. Other outputs would also include high availability options, optional software information, network utilization, and minimum disk capacity recommendations. The users of this tool will reap considerable benefits from the intuitive format involved, from the engineering help facility and the resultant immediate sizing feedback which will be provided.

The new Thin Client Sizer Tool is meant to help provide the optimum server configurations for the inputs which are based upon the benchmarking results involved. The information provided will include such items as—the system model, the amount of memory included, the type and number of processors.

The engineering technology optimization for the Thin Client team, will maintain e-@ction performance benchmarking data which is accessed by this tool.

Functionally, the Thin Client Sizer Tool is a Graphical User Interface-based application. When possible, Unisys Corp. and Microsoft Corp. interface standards will be followed.

The users will get a simple-to-use intuitive interface which is aided by engineering help facilities. Thus, they will be able to specify a customer's specific sizing requirements and quickly obtain the optimum server configuration recommendation. This recommendation and information can be printed and saved to file for later use.

Multiple sessions may be created, and existing sessions can be opened simultaneously.

The Thin Client Sizer Tool will consist of two major functions:
(a) a Configuration Session;
(b) a Server Configuration Solution report.

Configuration Session: This is a vehicle to be used to collect information on a customer's sizing requirements in order to generate the best solution to meet those requirements.

Server Configuration Solution Report: This is a report that will contain information on the optimum server configurations as determined from the customer information collected during the Configuration Session, and also the performance benchmarking results.

The application development environment is Microsoft's Visual Basic 6.0. The Benchmark data is stored in an MS Access database.

The chief function of the Thin Client Sizer Tool is to provide an "automated" method to specify a list of various server (e-@ction ES) configurations that can best satisfy a customer's requirements for the deployment of the Unisys Windows Terminal Server (including Microsoft and Citrix software). This function is to be accomplished with what is called the "Configuration Session", which is further illustrated in the co-pending U.S. Ser. No. 09/813,671, entitled "CONFIGURATION INTERVIEW SESSION METHOD FOR THIN CLIENT SIZING TOOL".

Configuration Session: The Configuration Session will involve an interview process that prompts the user to provide the required information on a particular customer's sizing requirements. Once the sizing requirements have been supplied, then the recommended optimum server configuration (plus other pertinent information) will be displayed.

The information to be gathered from the customer will pertain to the following items:
(i) Site: This is the physical location where the Windows Terminal Servers will be located, such as in named cities;
(ii) Server Farm: This consists of one or more Windows Terminal Servers which are configured together for unified administration, security and communication services, as an example, PeopleSoft. PeopleSoft may require two Server Farms for the Applications, or possibly a Human Resources function might require a server while the Payroll function may require a Server Farm.
(iii) User Type: This embodies the usage patterns of a particular group of users, since these patterns may have a significant impact on performance. These patterns involve average typing speeds. The User-types may be such personnel as entry clerks, secretaries, developers, and support personnel.
(iv) Application Type: This includes the CPU, the memory, and the disk resources typically required when running an application. By supplying the application types that will be running, this will help to size the Server Farm to sufficiently handle any client demand.

Additional information will be supplied as to the type of availability expected from the server, the use of optional software, such as Metaframe, load balancing, and ICA secure, network utilization information, and minimum disk capacity recommendations.

Server Configuration Report: Here, a report will be generated listing the optimum server configuration as determined by the information collected during the earlier Configuration Session interview process and the performance benchmarking results. Here, the information will include server availability, optional software, network utilization, and disk capacity. This report will be seen to have a number of features as follows:
(a) The report can be viewed on-line and printed upon request.
(b) The report will have a print preview and zoom-in feature.
(c) The report can be saved to disk for future reference.
(d) The report will contain the maximum number of users that each server could support.
(e) The report will contain the information collected upon which the configuration recommendation is based.

Code Modules: Code Modules will be used to group similar functions together—enabling both ease of maintainability and portability to other applications. The planned Code Modules for the Sizer Tool include:
(i) Application Program Interfaces (APIs)
(ii) Global Constants
(iii) Global Variables
(iv) Configuration Session Management
(v) Business Rules Routines
(vi) Message Handling Business Rules Component: The Business Rules Component will be used to store and maintain the performance benchmarking data for each supported Aquanta ES server. This data will be stored as "Business Rules" in a separately maintainable component—rather than embedding this is the Sizer Tools' logic. As new servers are benchmarked, the engineering technology optimization (Thin Client team) will be responsible for storing the new data in the Business Rules component to make it readily available to the field.

Microsoft Access was chosen to be the Business Rules component. Microsoft Access is a database application that uses the database file to store information using the Microsoft Jet database engine and is also easily accessible to Microsoft Visual Basic applications.

Figure 1B:
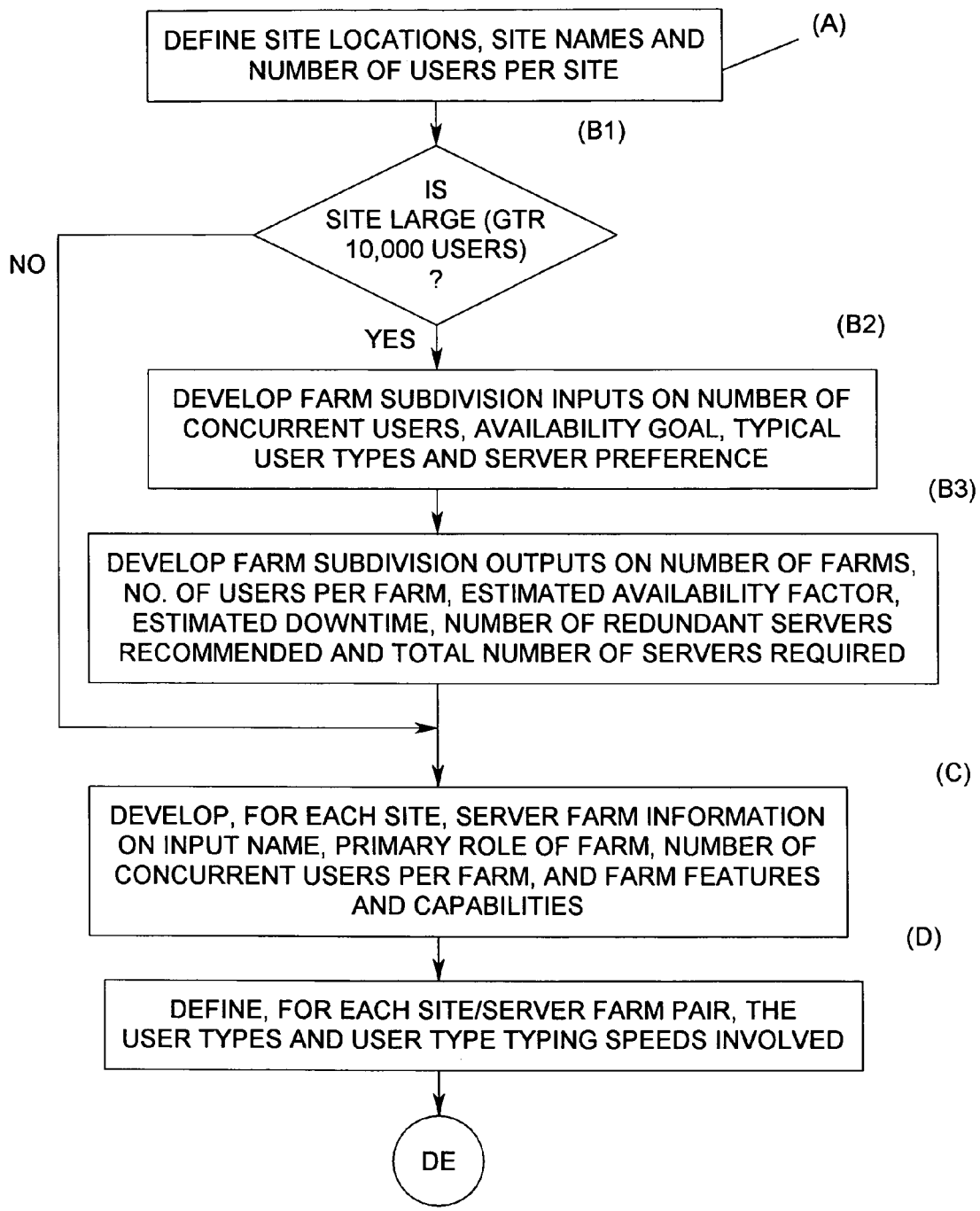
FIGS. 1B and 1C are flow charts showing a high level series of steps for developing an optimal configuration for a Server Farm and associated modules.
Figure 1C:
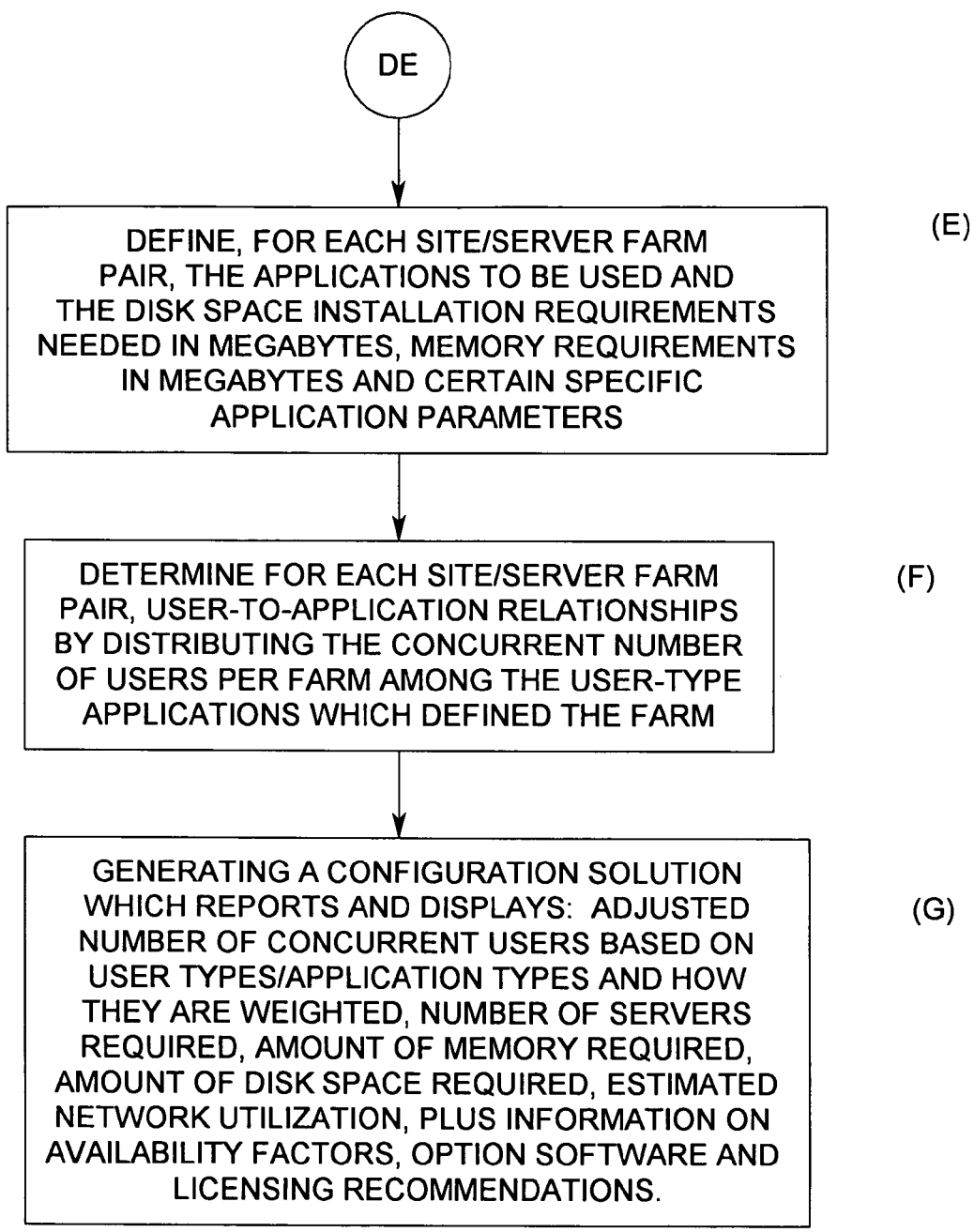

The overall sequence and method steps involved are indicated in generalized form in FIGS. 1B and 1C.

First referring to FIG. 1B, it is seen that a series of information must be collected in order to provide what is called a "customer profile". The customer profile is developed by the use of interview methods and inspection processes which may be indicated in FIG. 1B as steps A thru step D, and in FIG. 1C as steps E thru G.

Now referring to FIGS. 1B and 1C, it will be noted that step A involves getting information in order to define the site locations, the site names and the number of users per site.

At step B1, there is a decision as to whether the site is large and a recommendation for the subdivision of the site is necessary. If it is decided that this recommendation would be helpful (YES), the process goes to Step B2. Otherwise flow continues at Step C. If NO is involved, the sequence goes to step C.

At step B2, there is then developed further information regarding the Farm subdivision inputs regarding the number of concurrent users, the availability goal levels, the typical User-types and server preferences.

At step B3, further information is reported regarding Farm subdivision outputs on the number of Farms to be utilized, the number of users per Farm, the estimated availability level factor, the estimated downtime for the servers, and the number of redundant servers which would be recommended for the customer and the total number of servers that would be required to maintain the availability goal input in Step B2. Steps B2 and B3, are illustrated in greater detail in the co-pending U.S. Ser. No. 09/813,672, entitled "METAFARM SIZER CONFIGURATION OPTIMIZATION METHOD FOR THIN CLIENT SIZING TOOL".

At step C, there is developed for each site, the Server Farm information regarding the input name, the primary role of the Server Farm, the number of concurrent users per Server Farm, and the Server Farm features and capabilities. Information received in Step B3 can be applied here if that process path was taken.

At step D, there is accumulated information in order to define, for each server site/Server Farm pair, the User-types and the User-type typing speeds involved.

Then in FIG. 1C, the sequence is continued via the marker DE which continues onto FIG. 1C.

At step E, further collection of information is used to define, for each site/Server Farm pair, the applications to be used and the disk space installation requirements which will be needed, plus the memory requirements which will be needed in addition to certain specific other application parameters.

In FIG. 1C at step F, there is then determined the User-to-Application relationships involved by distributing (for each site/Server Farm pair) the concurrent Users-per-Farm among the User-type applications which define the Farm. Here, steps A, B1, C, D, E and F are illustrated in more detail in the co-pending application, U.S. Ser. No. 09/813,671, entitled "CONFIGURATION INTERVIEW SESSION METHOD FOR THIN CLIENT SIZING TOOL".

Then subsequently at step G, there is the generation of a Configuration Solution which reports and displays the adjusted number of concurrent users based on the User-types and the Application types, and how they are to be weighted, plus the number of servers required, the amount of memory required, the amount of disk space required, the estimated network utilization factor, plus other information on the availability factor levels, and optional software possibilities. Here, step G is illustrated in more detail in the co-pending applications, U.S. Ser. No. 09/813,670, entitled "SOLUTION GENERATION METHOD FOR THIN CLIENT SIZING TOOL"; U.S. Ser. No. 09/813,668, entitled "METHOD FOR CALCULATING USER WEIGHTS FOR THIN CLIENT SIZING TOOL"; and U.S. Ser. No. 09/813,669, entitled "METHOD FOR CALCULATING MEMORY REQUIREMENTS FOR THIN CLIENT SIZING TOOL".

FIG. 2 is a drawing of a typical Server Farm showing groups of servers collected together to form a Farm group. Depending on the customers' requirements and the type of situation environment the customer is involved in, such type of Server Farms will be developed in regard to the size of the Farm, that is to say, the number of servers per Farm, and also the availability level of the servers and the maximum usage for each server, and also the concurrent normal usage for each server. In FIG. 2, a typical Server Farm such as 10A will have a Database Server 12A, a series of Servers A1, A2 . . . AN, each of which has Application programs 10P, 20P . . . No. These Servers are connected via a Network 60 to Client Terminals 1, 2, . . . L. Similarly, the Server Farm K has the same pattern of multiple servers and multiple Application programs. The totality of the Server Farms can be designated as Metafarm 8.

FIG. 3 is a window showing the main form for the user interfaces. The thin client sizer main form will contain five menu items. The following set of drawings will describe each of the menus and their functions.

Figure 3A:
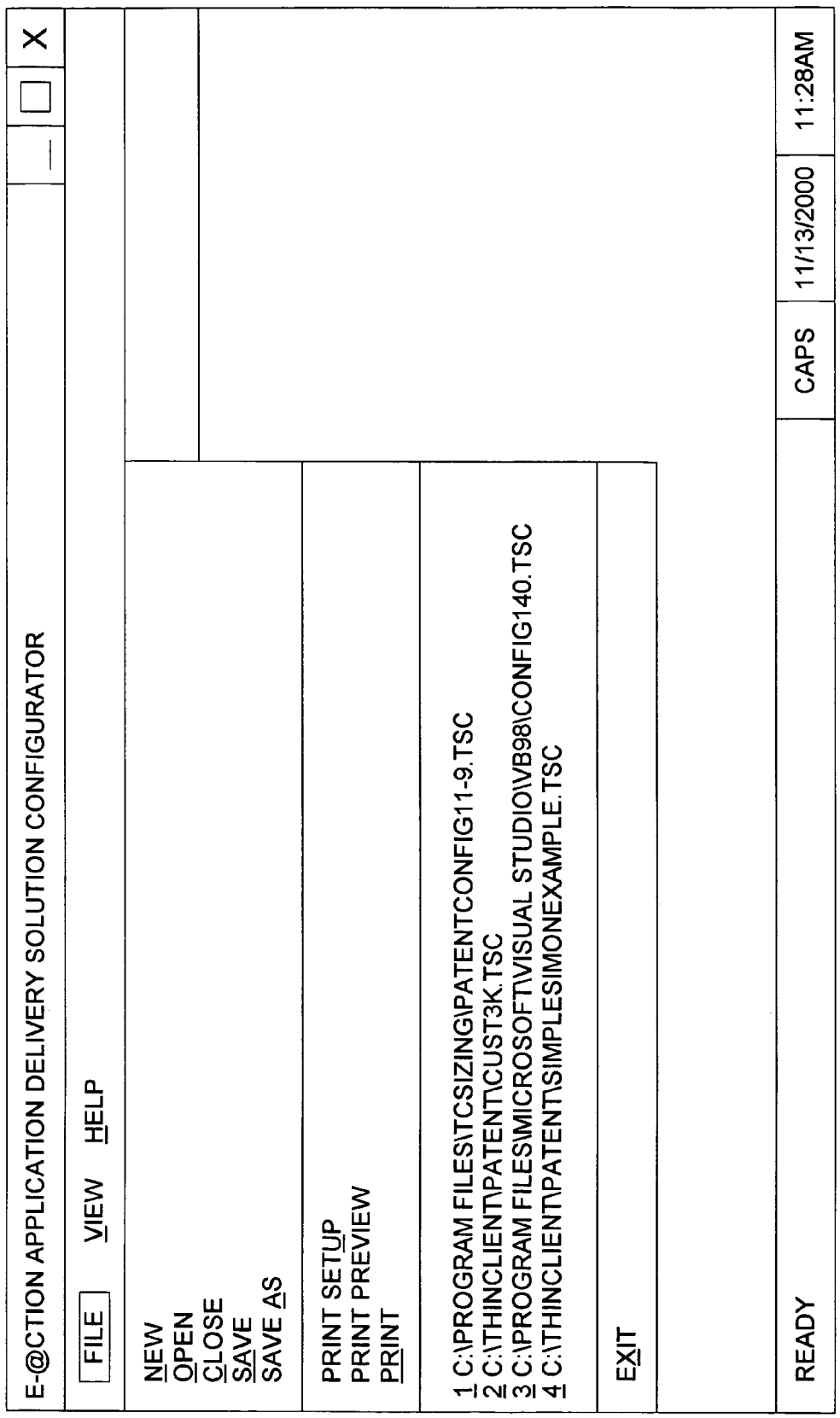
FIG. 3A is a window showing menu items.

The file menu on FIG. 3A of the Unisys Thin Client Sizer main form will contain menu items as follows: new, open, close, save, save as, print, print setup, print preview, print, last (5) file configuration files open, exit.

Figure 4:
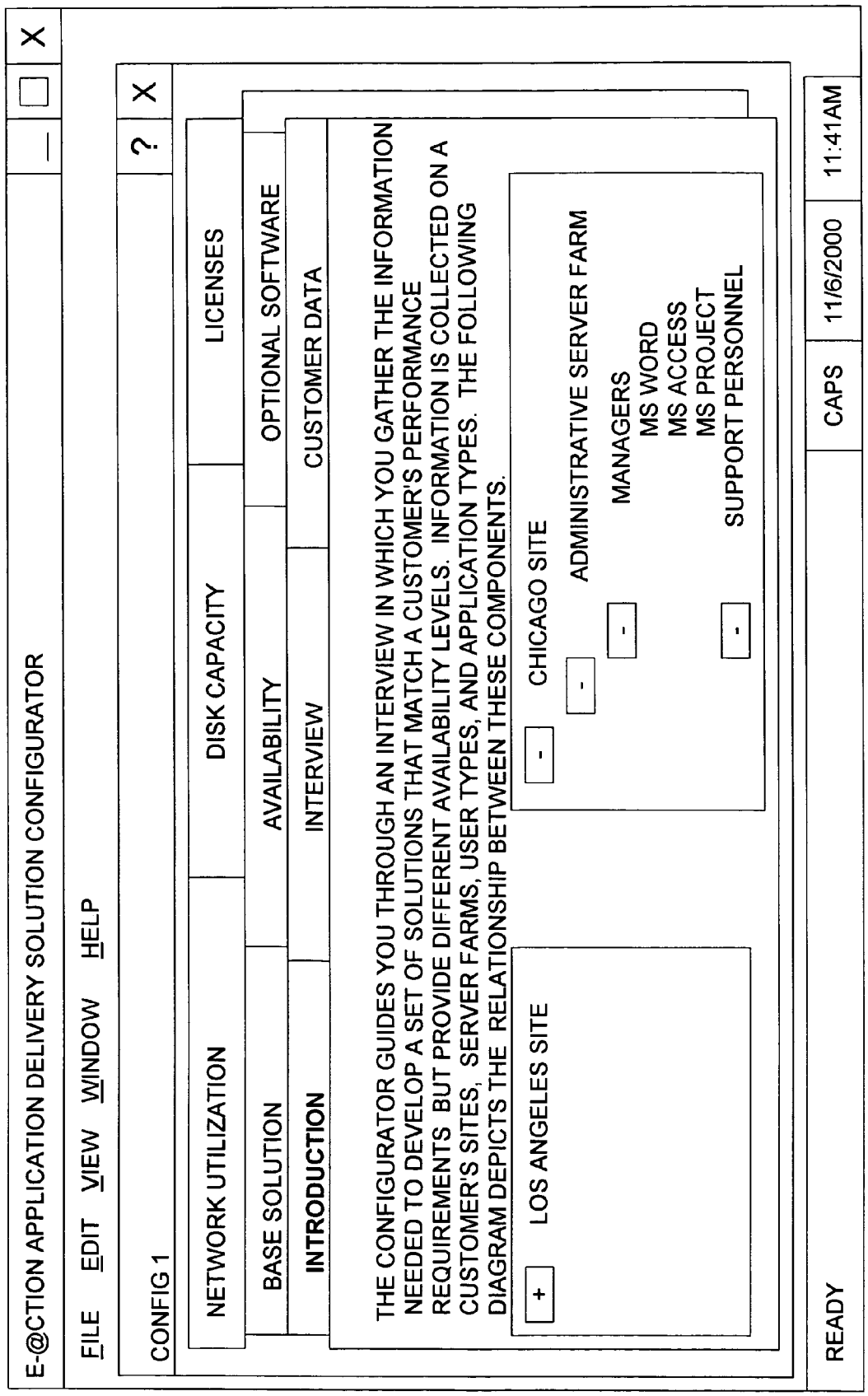
FIG. 4 is a window for displaying a typical example of a site and its server farms along with the type of applications and Users involved and contains a brief overview of the purpose of a configuration session.

FIG. 4 is the "configuration session form." The configuration session form is open when either New or Open is selected from the file menu. This form will use a tabbed format for organizing the information in a more effective manner. The tabs that are included on the form are: Introduction, Interview, Customer Data, Base Solution, Availability, Optional Software, Network Utilization, Disk Capacity, and Licenses tabs.

When a new configuration session is first created, only the Introduction and the Interview tabs will be enabled. Then upon completion of the Interview process and subsequent solution generation, the remaining tabs will then be populated with a configuration recommendation and then become enabled. This information may be updated at any time by returning to the Interview tab and changing any data under the appropriate category.

The Introduction tab of FIG. 4 contains a brief overview of the main purpose of a Configuration Session. A Configuration Session is used to collect information on the customer's sizing requirements. Once this information has been collected, then a recommendation on optimum server configurations can be provided. FIG. 4 gives an example of two different sites: one in Los Angeles and one in Chicago, and lists what is involved in terms of a Server Farm consisting of one or more user types (i.e., managers, support personnel, payroll clerks, etc.) and the applications they are expected to use (i.e., MS Office, MS Access, or PeopleSoft).

Figure 5:
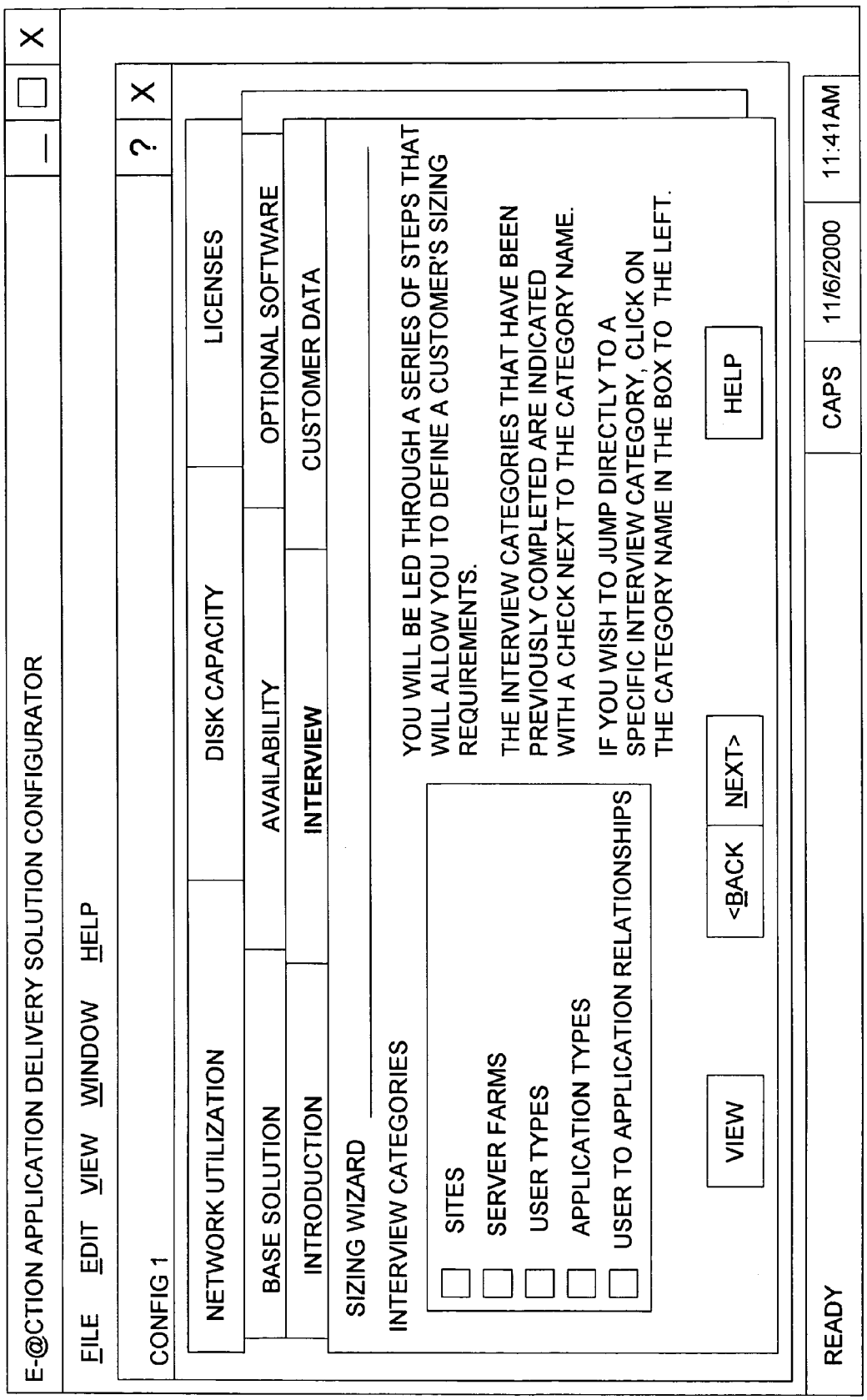
FIG. 5 is a window illustrating the various interview categories for developing information about a customer's requirements.

FIG. 5 is a window showing the Interview Tab. The Interview Tab contains a collection of enquiries sorted into related categories to collect the information on the customer's sizing requirements. As seen in this Window, the Interview categories will include Sites, Server Farms, User Types, Application Types, and User to Application Relationships. The user can traverse through the interview process by either clicking the Back or the Next buttons at the bottom of the tab. Once the interview process has been completed, the user can then click the FINISH button available at the bottom of the tab. By clicking the FINISH button, the solution will be generating allowing the remaining tabs to then be populated with the solution information determined based on the customer profile data collected during the interview process after it has been compiled with the current performance benchmarking results.

Along with the buttons shown as Back, Next, and Finish, there will be two other buttons also available:
 (i) View—when clicked, the current view of the customer information supplied up to that point will be displayed. An example is shown in FIG. 6.
 (ii) Help—when clicked, help information is provided for the current interview category and its field.

FIG. 7 is a window illustrating the sites interview category. The sites interview category will be the first category displayed and allows the user to provide information on the physical locations of the Windows Terminal Servers. After all of the customer's sites have been entered, the user will click the Next button and then the following Server Farms interview category is displayed at FIG. 8.

Figure 8:
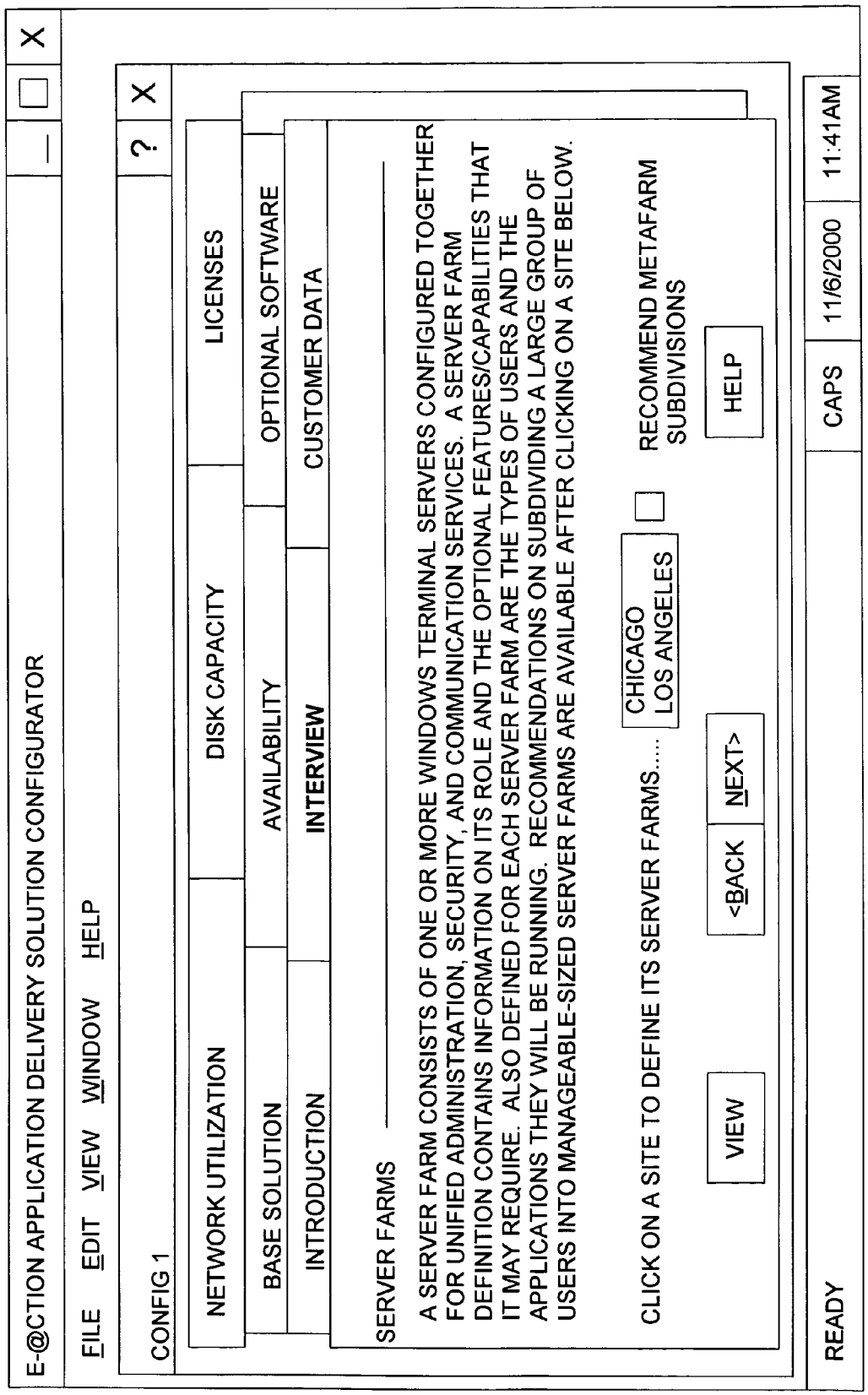
FIG. 8 is a window illustrating the Server Farm's interview category window which will allow the user to select which site is to currently be considered for defining server farms and allow for the option of receiving server farm subdivision recommendations for the selected site.

FIG. 8 is the Server Farm interview category: this is a window which allows the user to provide information on possible Server Farms for each of the customer's sites. If a customer needs to subdivide a large site into Server Farms, a recommendation can be received by clicking on the "Farm Subdivision Recommendation" check box prior to clicking on one of the customer's sites. When the recommendation is requested, the form in FIG. 9 is displayed when a site is selected.

FIGS. 9A, 9B, is the MetaFarm sizer page: this is a window which provides assistance for customers that need to divide a large group of users into manageable and efficiently sized Server Farms. The configurator initially uses internal default values for input into the sizer and allows a user to manipulate the input values if different scenarios need to be considered. When the user clicks on the ReCalculate button, FIG. 9A, the recommendation is regenerated with the current input values. When/if the user decides to apply the recommendation, FIG. 9B, the Apply button is clicked and the number of server farms and the number of users per farm in the selected recommendation is automatically entered in the next window (FIG. 10A) with generic farm names (i.e., "MetaFarmXXX").

If not requesting a subdivision recommendation, the next interview stage is entered from FIG. 8 by clicking on one of the customer's sites, causing a form to be displayed for entering information on the selected site's Server Farms. This form is shown in FIG. 10B. Here, there is indicated the primary role of the Server Farm and the total number of simultaneous or concurrent users to be configured on the server farm.

FIG. 11 is a window indicating the Server Farm's definition form-Optional Software tab. This requires the user to check any and all options that are required for the system. When all the Server Farms have been defined for a site, the user clicks the OK button to return to the interview process and completes the Server Farm definitions for any remaining sites. After all the customer's Server Farms have been defined, the user clicks the NEXT button at the bottom of the Server Farms interview category (FIG. 8) and subsequently the following the User Types interview category will then be displayed as indicated in FIG. 12.

Figure 12:
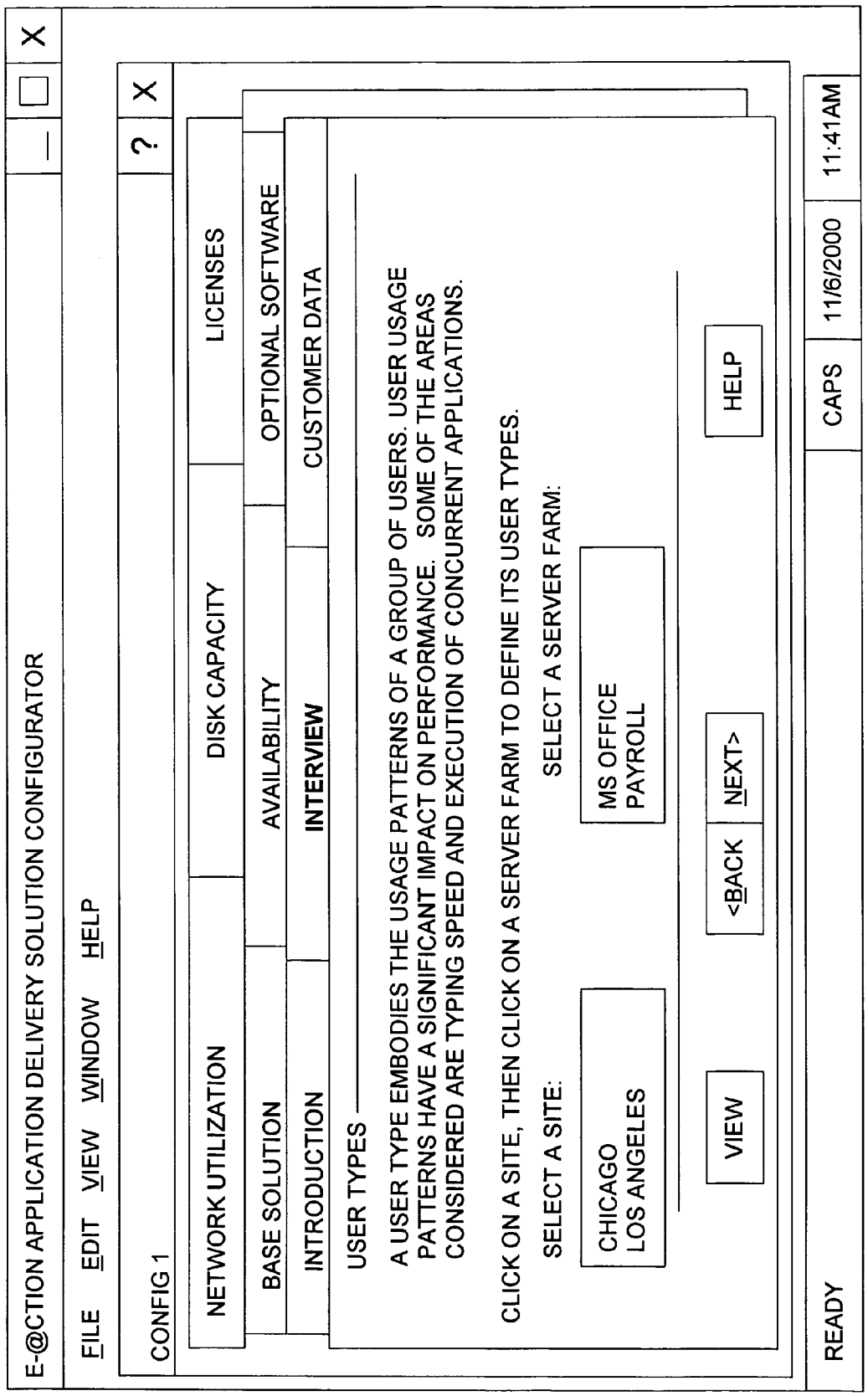
FIG. 12 is a window showing the User type's interview category, allowing the user to select a site and server farm in which to provide information on the possible User-types contained within each Server Farm.

FIG. 12 shows the user types interview category window. The user types interview category window will allow the user to provide information on the possible User Types contained within each one of the Server Farms. By clicking on one of the customer's Sites, then clicking on one of the Site's Server Farms, another form will be displayed for entering information on the selected Server Farms user types as will be seen in FIG. 13.

Figure 13:
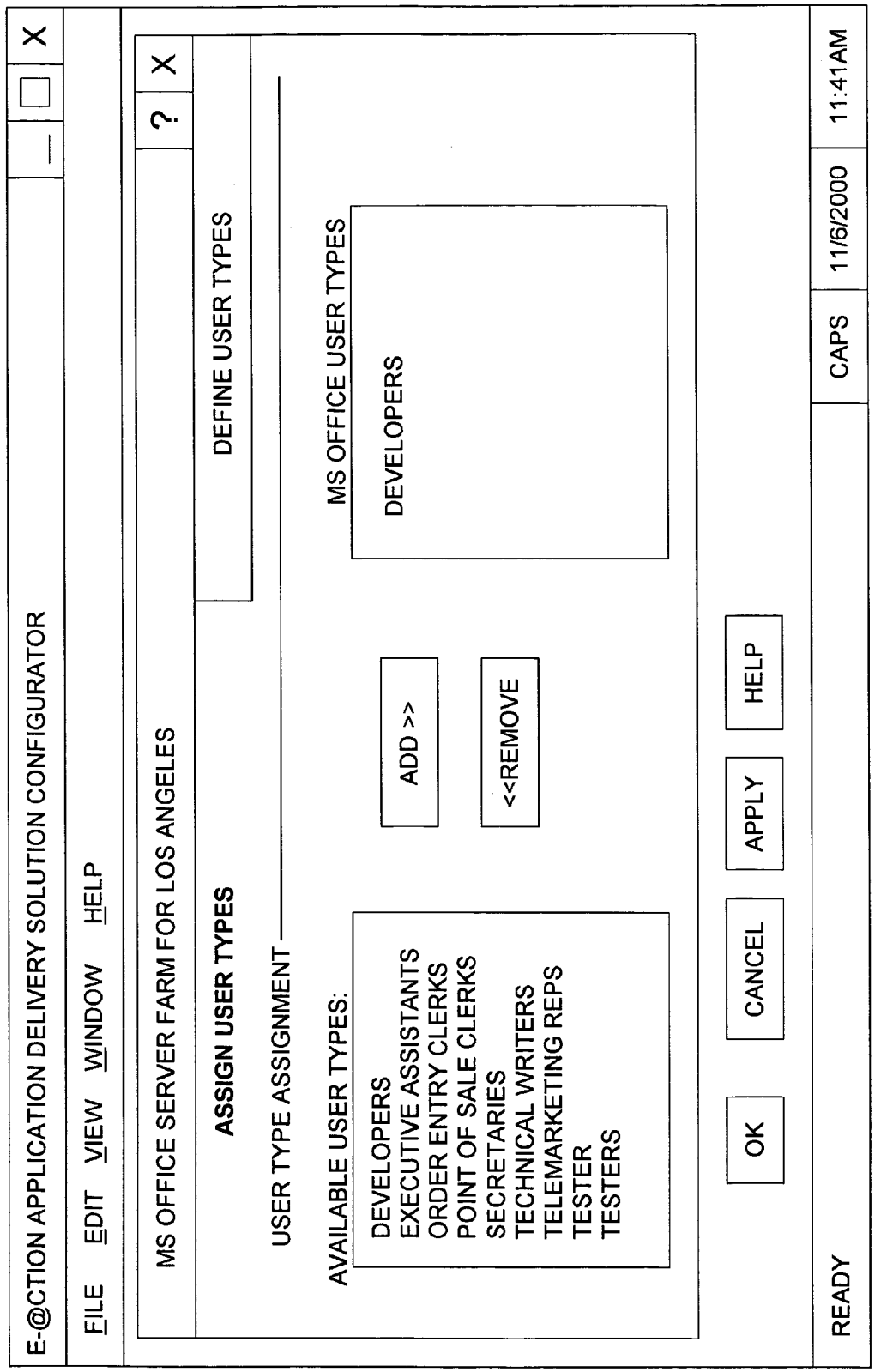
FIG. 13 is a window showing the User type's definition form—Assign User-Types tab, which enables one to include the particular User-types involved for the selected server farm.

FIG. 13 is a window showing the user types definition form—Assigned User Types tab. As seen in the example, a series of different user types such as managers, order entry clerks, technical writers, etc. are shown in one portion and another portion will add these to the Server Farm's list of user types.

Figure 14:
FIG. 14 is a window showing the User type's definition form—Define User-Types tab, which allows the User to define a new User type or to update the characteristics of an existing User type.

By continuing with the User-Types Definition Form, FIG. 14 now indicates a window which defines the User-Type's Tab. The "Define User-Types" tab allows the user to either define a new User-type, or update an existing User-type contained in the "Available User-Types" box on the Assign User Types tab. When all of the User-Types have been assigned to a Server Farm, the user will click the OK button to return to the interview process and assign the User-Types to any remaining Server Farms. After all of the Server Farms have been assigned User-Types, the user will then click the NEXT button at the bottom of the User-Types interview category in FIG. 12, and then the subsequent Application Types interview category will then be displayed as seen in FIG. 15.

Figure 15:
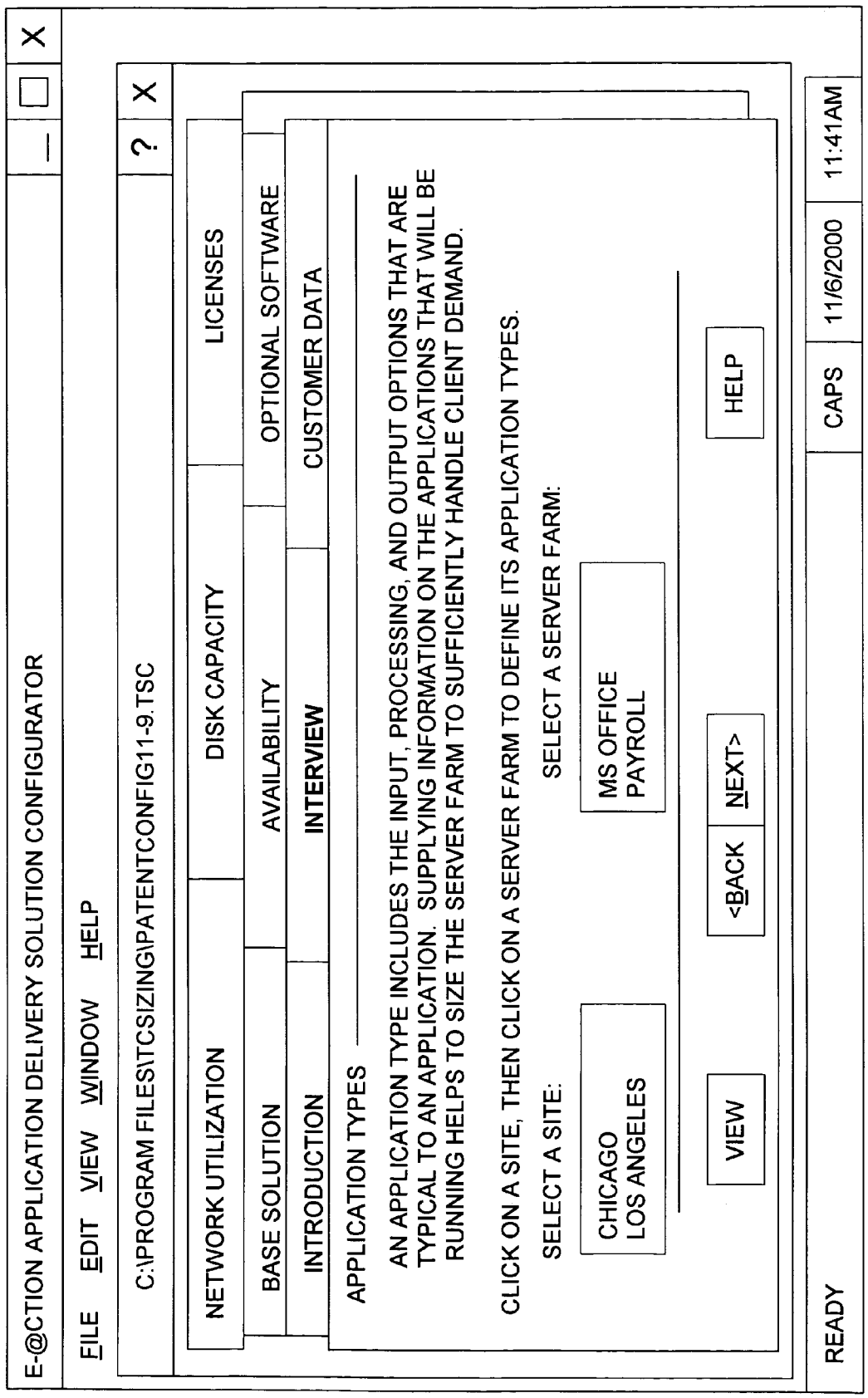
FIG. 15 is a window showing the application types interview category to allow the User to select which site and server farm for which the user will provide information on the possible types of applications running on each of the Server Farms.

FIG. 15 is a window illustrating the Application Types Interview Category. This Application Types Interview Category will allow the user to provide information on the possible applications running on each of the Server Farms. By clicking on one of the Customers' Sites, then clicking on one of the Sites' Server Farms, then a subsequent form (FIG. 16) will be displayed for entering information on the selected Server Farms Application Types.

Figure 16:
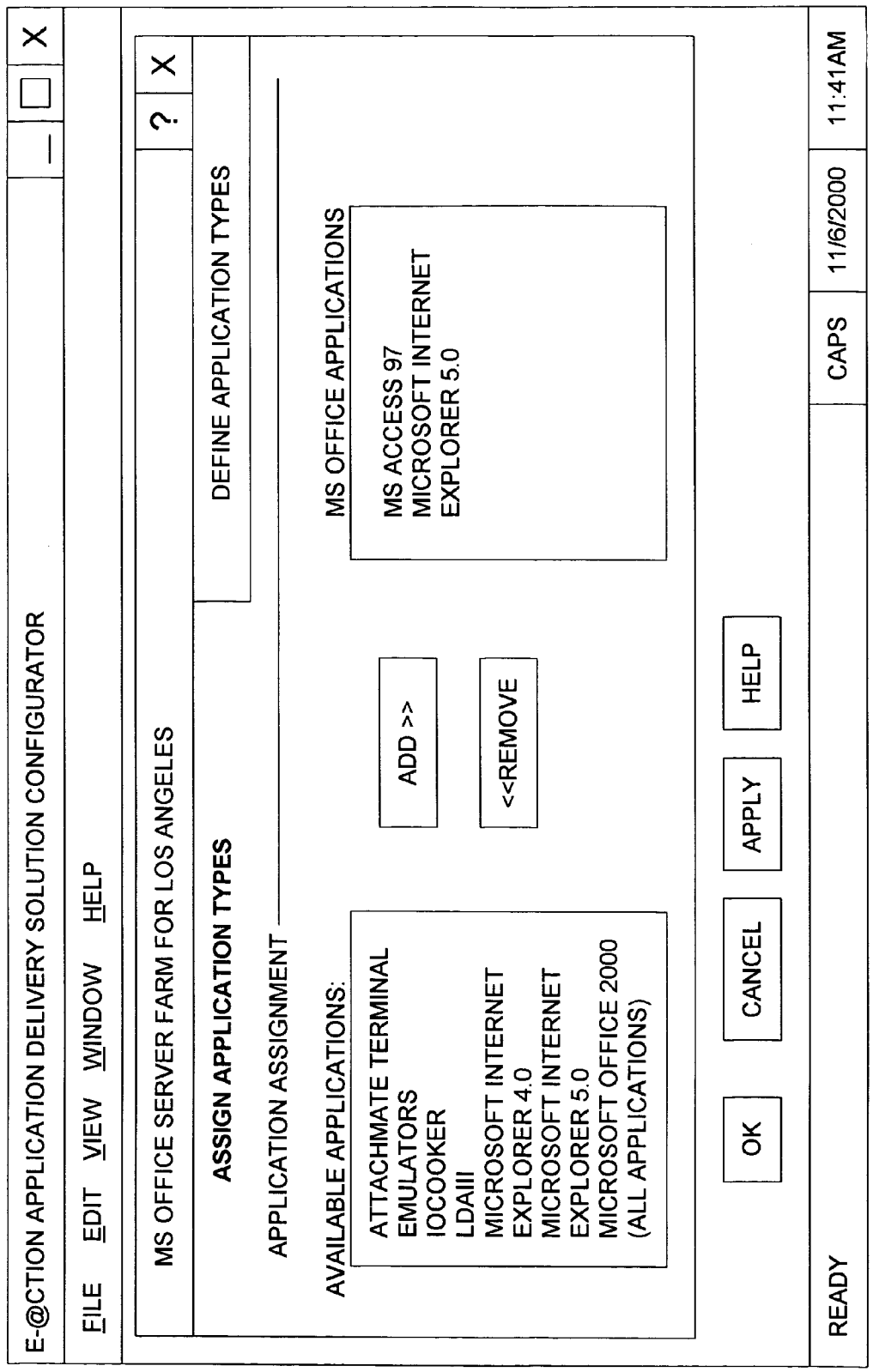
FIG. 16 is a window showing the application type's definition form—Assign Application Types tab, which enables the user to choose to add or remove certain types of applications according to the particular customer's Server Farm requirements.

The window shown as FIG. 16. is the Application Types Definition Form—Assign Application Types Tab. Here, there is shown a list of available applications which can be added or removed by clicking on the appropriate tabs. Further, another portion of the window indicates those particular applications which have been added or selected, such as the MicroSoft office applications designated "Microsoft Access Version 7.0, and Microsoft Office 95, Version Professional".

Now referring to FIGS. 17A, 17B, there is indicated windows which shows the Application Types Definition Form-Define Application Types Tab. The Define Applications Types Tab allows the user to either define a new application or update an existing application contained in the "Available Applications" box on the previous (FIG. 16) Assign Application Types Tab. Inserts are shown for Disk Space and memory required (FIG. 17A), plus options on Application Usage (FIG. 17B). When all the Application Types have been assigned to a Server Farm, the user will click the OK button to return to the interview process and assign the Application Types to any remaining Server Farms. After all the Server Farms have been assigned Application Types, the user will click the NEXT button at the bottom of the Application Types interview category in FIG. 15, after which there will subsequently appear the User-to-Application Relationships Interview Category as seen in FIG. 18.

Figure 18:
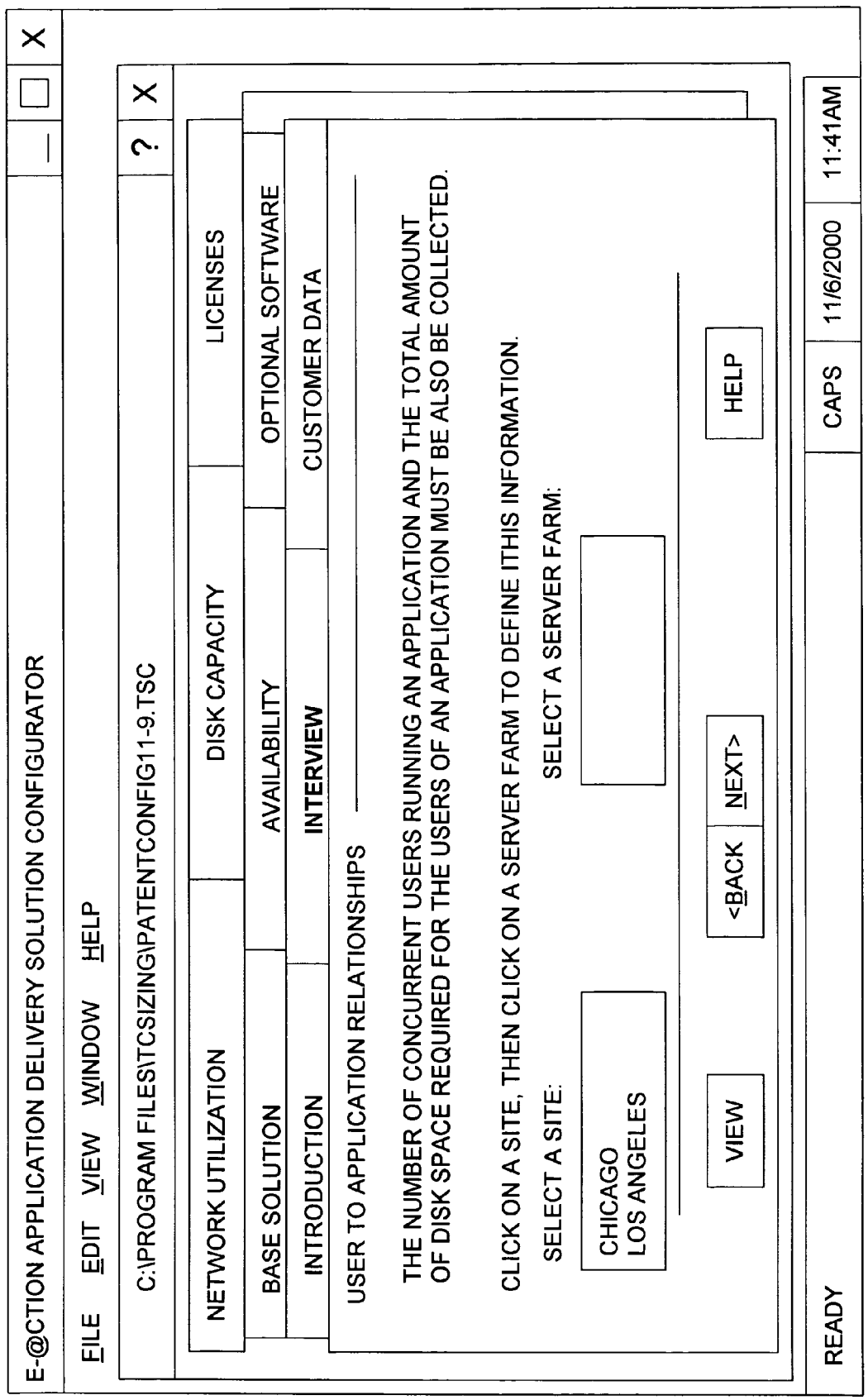
FIG. 18 is a window showing the User-to-Application relationship (interview category) to allow the User to select which site and server farm for which the user will provide information on the relationships between the User-types and the Application types on each of the Server Farms.

FIG. 18 illustrates a window showing the User-to-Application Relationships Interview Category which will allow the user to provide information on the relationships between the User-Types and the Application Types on each of the Server Farms. By clicking on one of the Customers' Sites, then clicking on one of the Sites' Server Farms, the next subsequent form will be displayed (FIG. 19) for entering information on the selected Server Farms Relationships.

FIG. 19 illustrates the window designated as User-to-Application Relationships Form—Concurrent Users Tab. As a particular example, this particular window shows that the Microsoft Office 95 Application has 75 manager-users and 300 support personnel users, while the Microsoft Access Application Version 7.0, has 75 manager-users and 300 support personnel users.

FIG. 20 illustrates a window entitled "User-to-Application Relationships Form—Disk Space Tab". This window involves the disk space assignment, where under each User-Type there is entered the total amount of disk space required in megabytes for all users which run the applications listed, which are shown for example, that Microsoft Office 95 utilizes 125 MB of disk space for manager-users and 500 MB for support personnel. Likewise, Microsoft Access also has disk space requirements of 125 MB for all manager-users and 500 MB for support personnel users.

When all the relationships have been defined for the Server Farm, the User will then click the OK button to return to the interview process and complete the relationships definitions for any remaining Server Farms. After all the relationships for all the Server Farms have been defined, the user will click the "NEXT" button at the bottom of the User-to-Application Relationships Interview Category in FIG. 18, and the subsequent form, (FIG. 21) will then be displayed.

Figure 21:
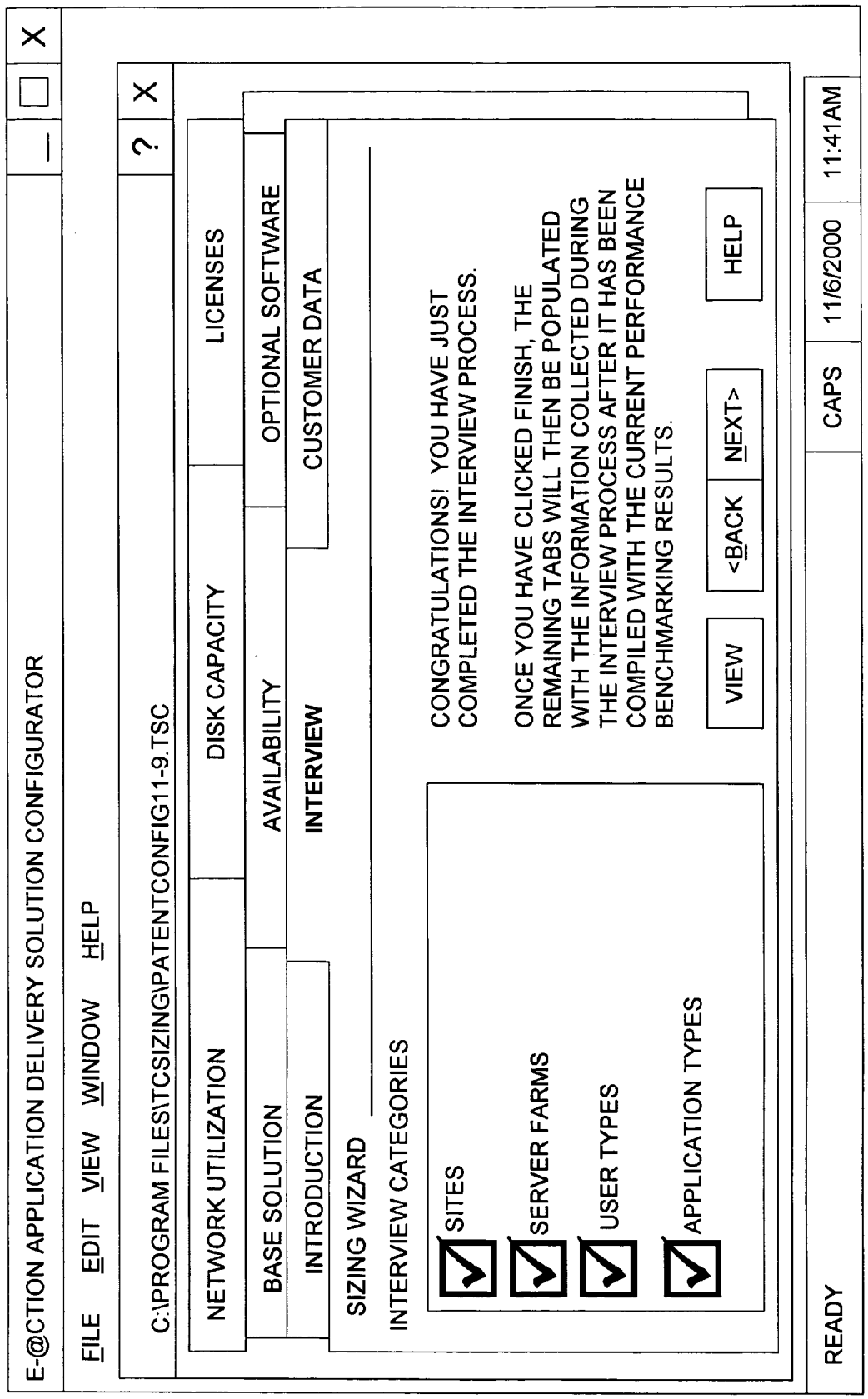
FIG. 21 is a Thin Client Sizer Configuration window, such that when the User clicks the "finish" button at the bottom, then the remaining tabs will be populated with the information collected during the interview process after it has been compiled with the current performance benchmarking results.

FIG. 21 is a window illustrating the Interview Categories which are shown and listed as Sites, Server Farms, User-Types, Application Types, and User-to-Application Relationships. Check marks indicate that the specific interview category is completed. When the user clicks the "FINISH" button at the bottom of this form window, the remaining tabs will then be populated with the information collected during the Interview process after it has been compiled with the current performance benchmarking results.

Figure 22:
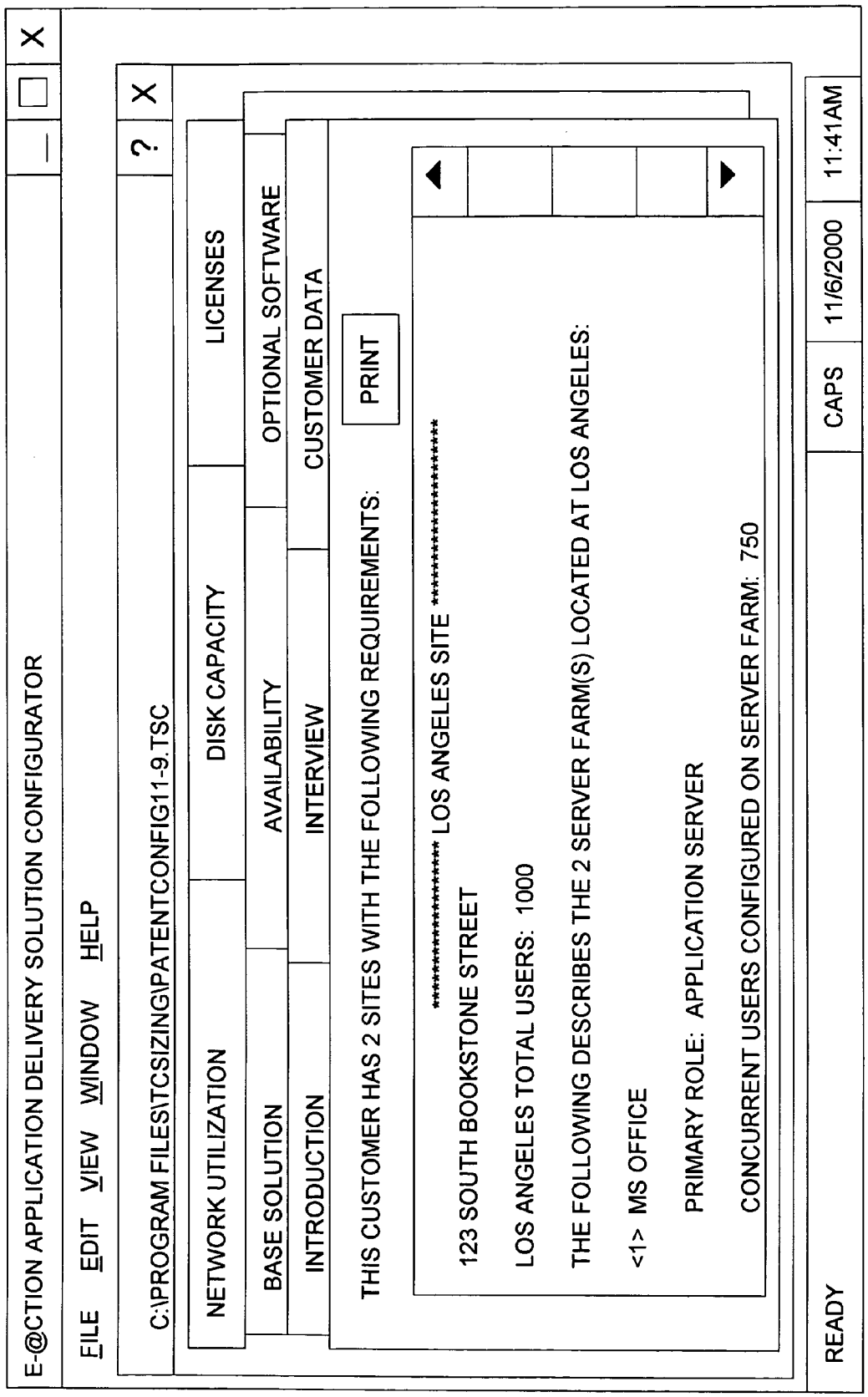
FIG. 22 is a window showing the Customer Data tab which contains the customer information collected during the interview process.

FIG. 22 is an illustration of the window designated as the Customer Data Tab. This tab will contain the Customer information that has been collected during the Interview process. The window will show an overview of the Customer Information, such as indicating the Customer's Sites, the total number of users, and a description of the Server Farms involved at the particular site.

Figure 23:
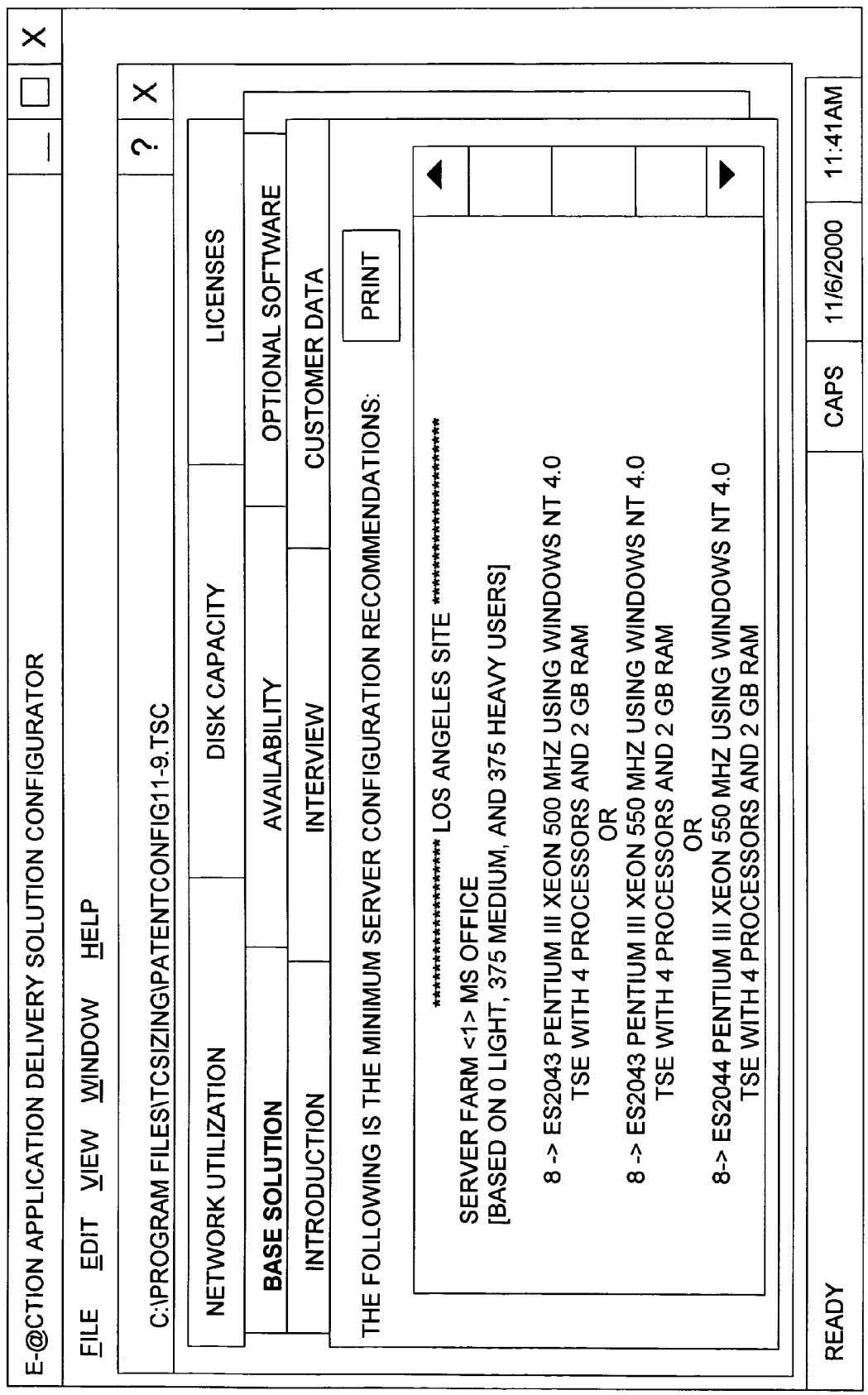
FIG. 23 is a window showing the Base Solution tab which will contain the optimum server configuration recommendations based on the customer information collected and compiled against performance benchmarking results.

FIG. 23 illustrates a window designated as the Base Solution tab. This tab will contain the optimum server configurations recommendations based upon the Customer Information collected during the Interview process and compiled against the performance benchmarking results. For example, the window will show the Server Farms involved at each of the sites, which gives definite specifications for the server modules and the memory requirements involved.

FIGS. 24A, 24B, are an illustration of the windows designated as the Availability Tab. This tab will contain information on the best solution to handle the customer's expectations on the availability level involved. This window will indicate the various sites involved, together with the recommendation for each Server Farm in regard to the level of availability recommended.

FIG. 25 is an illustration of a window designated Optional Software Tab, which will describe the Citrix MetaFrame add-ons which are required to meet the customer's needs. Here, each particular Site is delineated together with the recommendation on the Citrix MetaFrame add-on with load balancing and ICA secure options.

Figure 26:
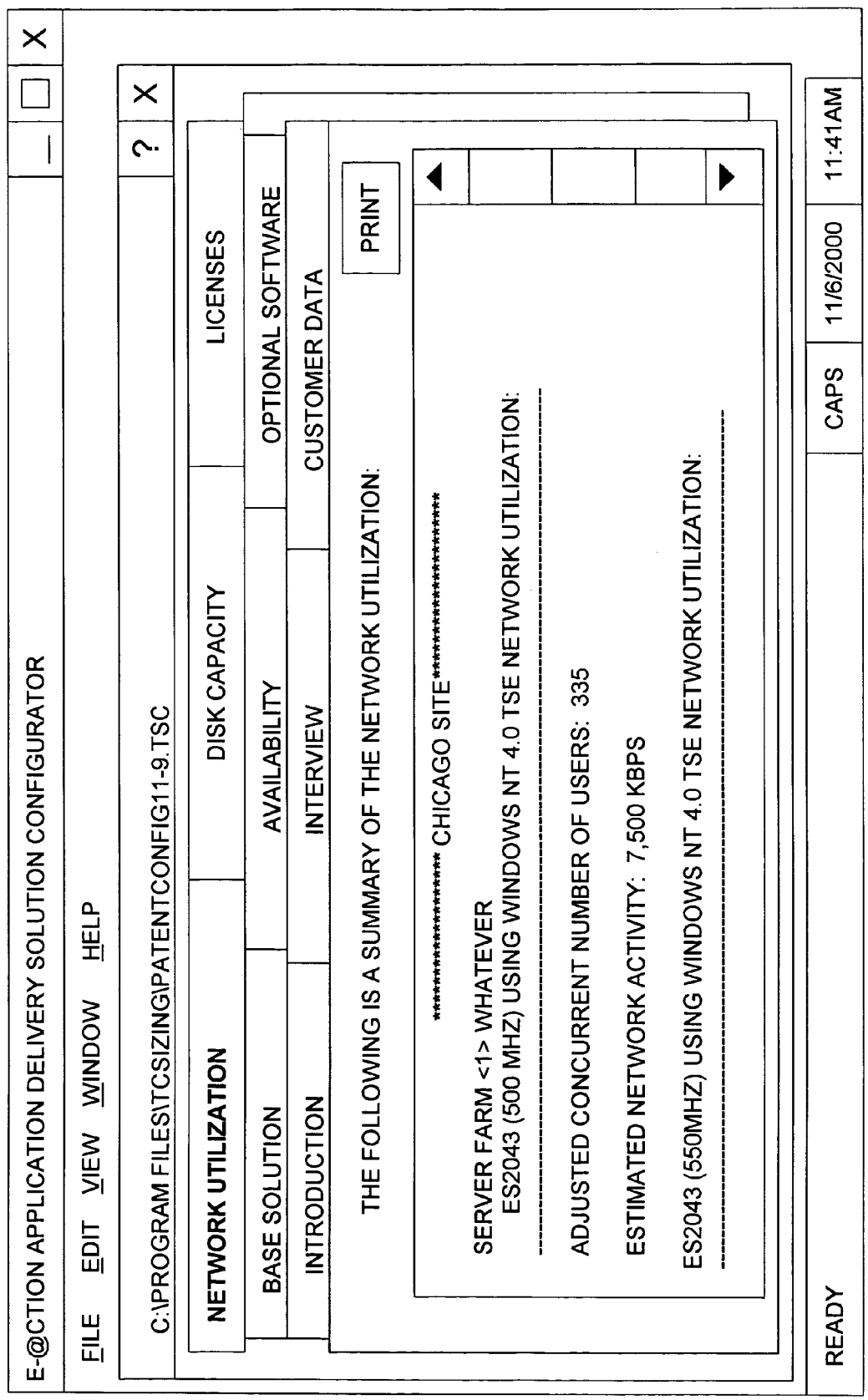
FIG. 26 is a window showing the Network Utilization tab which will provide the bandwidth information based on the number of users and the characteristics of the applications they are expected to use.

FIG. 26 is a window illustrating the Network Utilization Tab which will provide the bandwidth information based upon the Customers' User-Types. As related to this window, for each site there is given the total number of simultaneous users, such as 500 (FIG. 7) for the Chicago site, and 1,000 (FIG. 7) for the Los Angeles site. Further, there is shown the Chicago concurrent users of 335.

Figure 27:
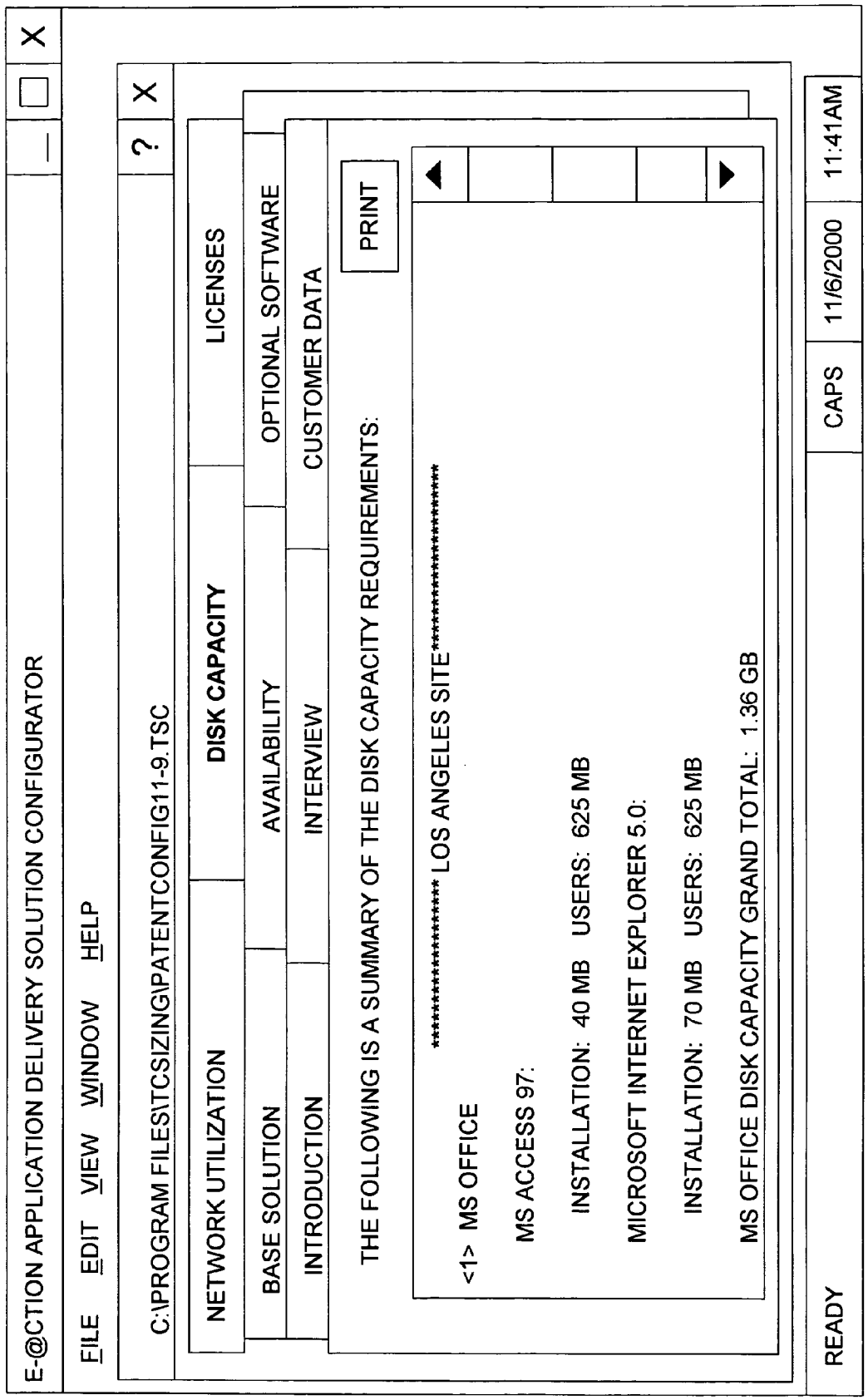
FIG. 27 is a window showing the Disk Capacity tab which will contain and show the minimum disk capacity recommended to fulfill the customer's requirements.

FIG. 27 is a window illustrating the Disk Capacity Tab which will contain the minimum disk capacity recommendation which is based upon the customer's requirements. As an example, the Los Angeles site for the MS Office Server Farm indicates the operating system requires a total of 1.36 gigabytes. This involves 40 MB for MS Access installation and 625 MB for users in addition to MS Explorer requiring 70 MB installation and 625 MB for users.

Figure 28:
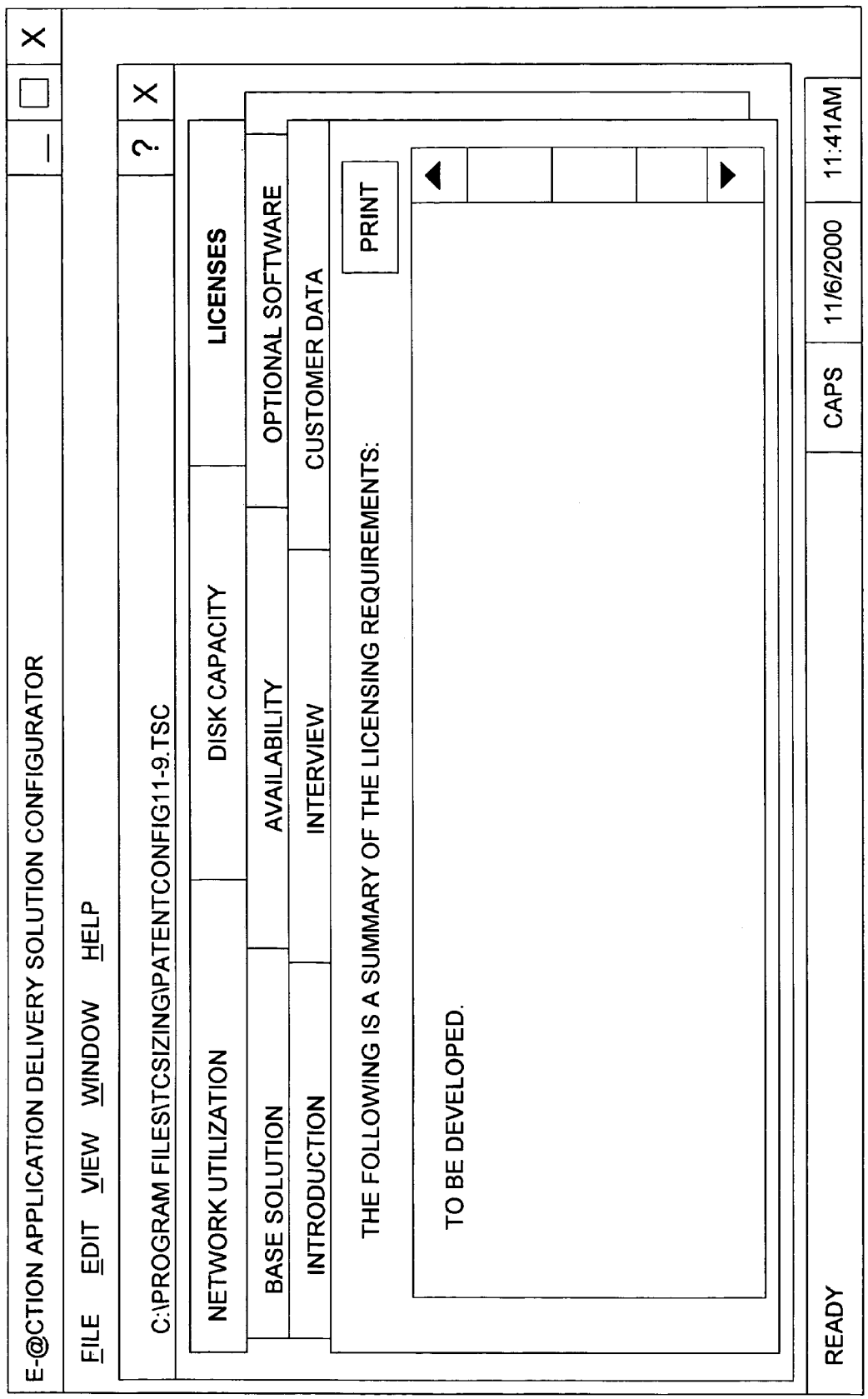
FIG. 28 is a window showing the Licenses tab which will be used to provide Thin Client license information based upon the customer's requirements.

FIG. 28 is a window showing the Licenses Tab screen which is used to compile information on any relevant licensing items necessary for the configuration.

Described herein has been a Thin Client Sizing Tool which utilizes a series of windows screens to accumulate information to develop a customer profile which can be processed by internal algorithms to provide an optimized configuration of one or more Server Farms, together with their disk and memory requirements, and which will output an optimal set of design arrangements most appropriate for a particular customer's enterprise.

While a preferred embodiment of the invention has been delineated herein, it should be understood that the invention is not limited thereto and should be defined according to the claims attached hereto.

What is claimed is:

1. In a customer-designer relationship process wherein a customer profile is developed which can then be input to an algorithmic method for developing an optimized solution for a Server Farm and associated modules which would be most suitable for the customer, and wherein certain factors are developed which include (i) the customer's sizing requirements which indicate the number of servers which may be required and their availability levels which indicate the percentage of operating "on" time predicted for each server; (ii) the physical site locations of each Server Farm according to its locational address; (iii) the total number of users at each locational site; (iv) the concurrent number of users at each site that are operating at a given period of time; (v) the working types and number of users operating at each site; (vi) the types of application programs that will be used by each type of working user; (vii) specifying the number of concurrent users as to their User-type in relationship to their use of each application type, a method for configuring a Server Farm network comprising the steps of:

(a) establishing on a Windows screen, a configuration session between the designer and the customer in order to develop the customer's sizing requirements;

(b) generating a display report which will recommend the optimum server configuration and other necessary information to optimize the customer's requirements.

2. The method of claim 1 wherein step (a) of said configuration session includes the steps of:

(a1) establishing on a Windows screen, the physical site locations where a Server Farm containing terminal servers will be located;

(a2) establishing on a Windows screen, the total number of users to be located at each of said sites and the concurrent number of users at any given period of time;

(a3) establishing on a Windows screen, the User-Types involved at each site which enumerates the number of the various types of specific Users involved;

(a4) establishing on a Windows screen, the application program types that will be used by each of the User-Types;

(a5) establishing on a Windows screen, the relationship between User-types and Application program types to specify the number of concurrent User-type Users for each Application type.

3. The method of claim 1 which includes the factor of (viii) defining the default level of availability which specifies the maximum level of predicted downtime for each Server Farm; (ix) establishing a desired Availability Level for each Server Farm to indicate the percentage of time that the client expects the systems and applications in the Server Farm to be accessible by all of the Users; (x) the minimum mount of disk capacity that will be required to support each Server Farm; (xi) the minimum amount of memory needed to support each Server Farm; (xii) the network utilization capacity to handle network activity in kilobits-per-second for each Server Farm; (xiii) the possible need for added optional software for work enhancements; and (xiv) the amount of disk capacity that will be required to support each Server Farm, wherein step (b) includes the steps of:

- (b1) establishing on a Windows screen, the default level of availability for the Server Farm and the supporting modules;
- (b2) providing an interactive Availability Calculator to determine the desired or future Availability Level of the Server Farm;
- (b3) determining whether optional software, including MetaFrame, Load Balancing Software, and ICA Secure Software, will be required for the configuration;
- (b4) determining the minimum amount of disk capacity required, the minimum amount of memory required, and the network utilization capacity for the Server Farm configuration;
- (b5) determining a base Server Farm configuration which involves a specific number of Servers which is based on an adjusted number of Users of the Server Farm;
- (b6) generating and displaying Windows or printed reports which indicate the optimum base server configuration which will also indicate the server availability, the optional software, the network utilization, the disk capacity, and any required licenses.

4. A system for developing a customer profile which indicates the various capabilities and requirements of the customer to be used as input for generating a optimized configuration report, and wherein certain factors are developed which include: (i) customers' site locations for Server Farms as indicated by a locational address; (ii) the types of users which indicates their workload activity and the number of users for each Server Farm; (iii) the types of application programs used by each of the users in each Server Farm; (iv) establishing the level of expected availability for each server to estimate the maximum period of downtime predicted; (v) setting a figure for the maximum allowable number of users for each Server; (vi) establishing the concurrent number of users for each Server on an average basis; (vii) establishing a benchmark value to indicate the total number of users that the Server systems will support; (viii) means to establish the optimum Server Farm configuration to suit the needs of a specific customer, said system comprising:

- (a) a plurality of window screens which can be displayed on a personal computer for inputting a series of parameters which develop a customer profile;
- (b) Windows screens for developing the customer's site locations for his terminal servers, and for inputting the types of users and the number of users that will be using the Server Farm, and for inputting the application program types to be used by each of the users of the Server Farm;
- (c) auxiliary Windows screens for inputting the level of availability expected from the server, the maximum number of users for each server, and the concurrent number of users for each server plus the use of various benchmark and network utilization parameters;
- (d) algorithmic means for calculating and displaying the optimum server configuration suitable for fitting the customer's profile.

5. A system involving an information collection process for designing, configuring and optimizing a Server Farm for a customer's Enterprise system comprising:

- (a) a server information database means for holding benchmarks and informational data on a plurality of servers to be utilized;
- (b) a sizing database means for holding User-type and Application-type attributes;
- (c) a configuration database template means for storing information collected from window screens used in the information collection process;
- (d) a configuration session database means for providing information to an Application Delivery Solution Configurator to enable algorithmic steps to be implemented for developing an optimized Server Farm configuration for meeting a customer's requirements;
- (e) Application Delivery Solution Configurator means which provide programmatic methods for accessing information from said server information database means, from said sizing database means, from said configuration database template means, and from said configuration session database means, for application to a sequence of algorithmic steps which will provide a series of output reports which will indicate optimum Server Farm configurations, said Application Delivery Solution Configurator means also including input information developed from customer-client-user profile information;
- (f) information means developed from customer client-user communication and that of a system designer which can then be input to said Application Delivery Solution Configurator means.

* * * * *